(12) United States Patent
Field et al.

(10) Patent No.: US 9,055,030 B2
(45) Date of Patent: Jun. 9, 2015

(54) MONITORING AND USING TELEMETRY DATA

(75) Inventors: Brian Field, Evergreen, CO (US); Jan Van Doorn, Castle Rock, CO (US); Joseph Kiok, West Chester, PA (US); Daniel Groustra, Littleton, CO (US); Mark Torluemke, Centennial, CO (US); Jim Hall, Centennial, CO (US); John Leddy, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 990 days.

(21) Appl. No.: 13/181,869

(22) Filed: Jul. 13, 2011

(65) Prior Publication Data
US 2013/0018632 A1    Jan. 17, 2013

(51) Int. Cl.
*G06F 15/16* (2006.01)
*H04L 29/08* (2006.01)

(52) U.S. Cl.
CPC .................................. *H04L 67/025* (2013.01)

(58) Field of Classification Search
CPC .............................. H04L 67/00; G06F 11/00
USPC ................................................... 709/206, 224
See application file for complete search history.

(56) References Cited

U.S. PATENT DOCUMENTS

| 2007/0220545 A1* | 9/2007 | Awano ............................. 725/34 |
| 2010/0076909 A1* | 3/2010 | Suri et al. ........................ 706/11 |
| 2011/0252337 A1* | 10/2011 | Pignataro et al. ............. 715/748 |

* cited by examiner

*Primary Examiner* — Ebrahim Golabbakhsh
(74) *Attorney, Agent, or Firm* — Banner & Witcoff, Ltd.

(57) ABSTRACT

Aspects of the disclosure relate to monitoring and using telemetry information in various ways. For example, a system that monitors telemetry information may include a user that gathers telemetry information of a device and transmits the information to a monitored room. A manager may join a monitored room and monitor the monitored room for particular types of telemetry information. In one example, a manager may determine whether a downstream device is experiencing a network problem, such as a low bitrate. A manager may also transmit commands to the player via the monitored room, which causes the downstream device to operate in accordance with the transmitted command. In one example, a manager may transmit a command that causes a player to decode a particular service.

20 Claims, 14 Drawing Sheets

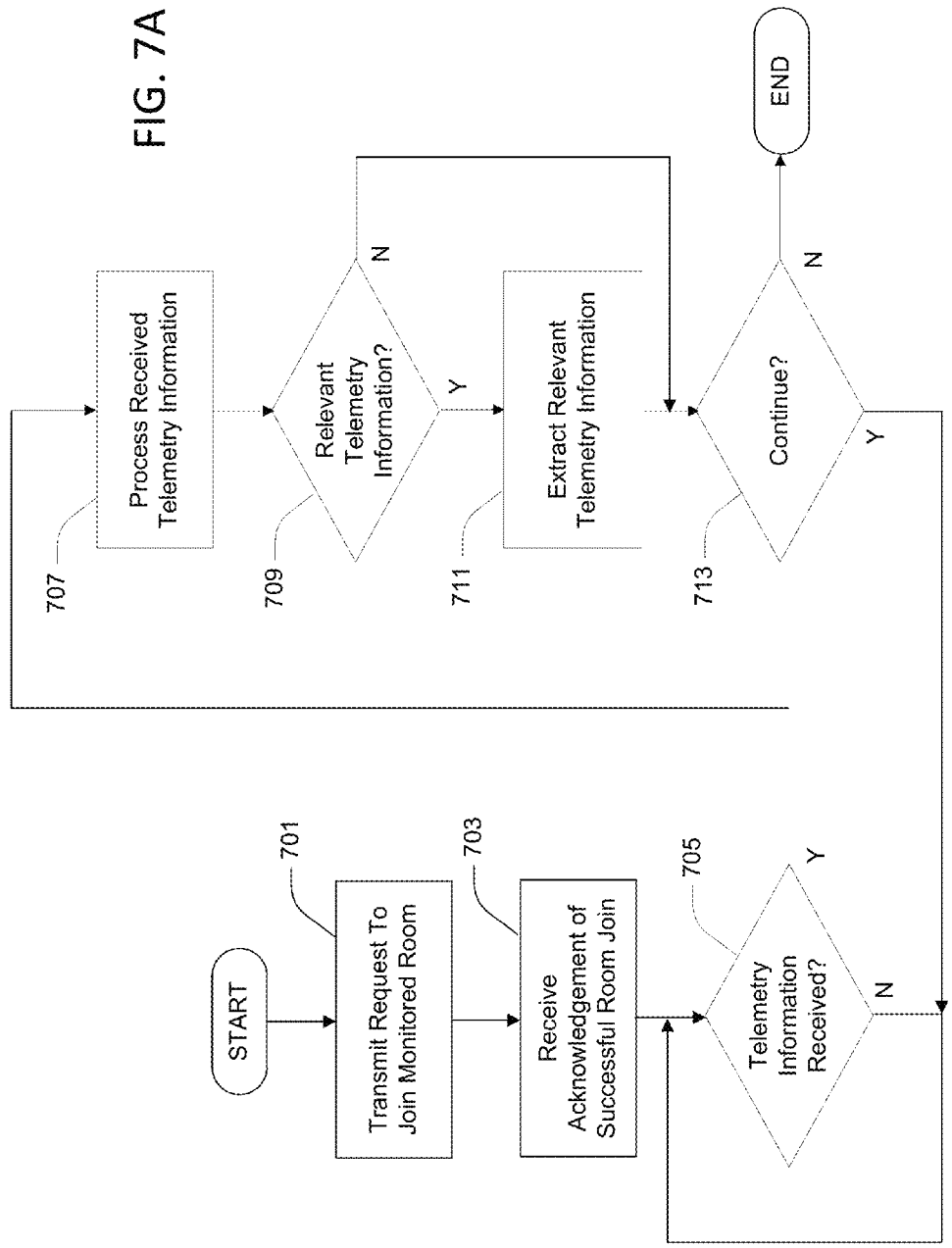

MONITORING AND USING TELEMETRY DATA

BACKGROUND

Network-enabled devices may be deployed in numerous premises throughout information distribution networks that serve numerous end-points over a wide region, such as households and/or businesses. Content providers distribute or provide access to content, services, and other information to the end-points via the information distribution network. A cost in delivering the content, services and other information to the end-points includes the cost associated with determining and/or identifying problems occurring throughout the distribution network. For example, a user may interact (e.g., telephone call, e-mail, web chat session, etc.) with a representative of the content provider when the user experiences a problem. The representative may proceed to discuss the problem with the user to determine if a problem exists, identify the existing problem, determine a potential solution to the problem, and initiate a potential fix. One difficulty is that the problem observed by the user may be the result of an issue occurring at any point throughout the network. Thus, there exists a need for an improved system and method to monitor and diagnose a network.

SUMMARY

Some aspects of the disclosure relate to methods and systems for efficiently monitoring telemetry data, gathering more informative telemetry data and/or more effectively using telemetry data.

One or more aspects described herein may relate to various functions and processes related to monitoring telemetry information and using the monitored telemetry information. For example, a method of monitoring and using telemetry information may include joining a manager to a monitored room. The monitored room may be configured to transmit information among members or users of the monitored room using, for example, a messaging protocol that conforms or is similar to an instant messaging protocol, a chat messaging protocol, and/or a real-time text-based messaging protocol. The method may include receiving at the manager, via the monitored room, telemetry information related to a downstream device of the distribution network in a message using the messaging protocol. The manager may be configured to monitor for telemetry information of a first type. The method may include determining, by the manager, that the received telemetry information includes information of the first type. Additionally, the method may include extracting, by the manager, telemetry information from the received telemetry information. The extracted telemetry information may include information of the first type.

One or more aspects described herein may also relate to various functions and processes related to sharing and/or using the telemetry data in and throughout various components of a distribution or access network. For example, various managers may monitor the telemetry data to identify telemetry information relevant to the specific manager. In one example, a video service manager may monitor the telemetry information to determine whether the video services are operating correctly to various end-point devices. In other examples, managers may be configured to monitor telemetry information to identify information relevant to operational, business and/or engineering needs. In one instance, an advertisement manager may be configured to monitor the telemetry data in order to identify information related to advertising, such as ad insertion, ad playback, user interaction with an advertisement, etc. In another example, an engineering manager may be configured to monitor the telemetry data to determine large-scale network issues affecting multiple end-point devices, such as wide-spread low bit rates, packet loss, network congestion, etc.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below. Further details of above and/or additional features will be described in the sections that follow.

BRIEF DESCRIPTION OF THE DRAWINGS

The present disclosure is illustrated by way of example and not limited in the accompanying figures in which like reference numerals indicate similar elements and in which:

FIG. 7A illustrates an example method for processing telemetry information at a manager according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
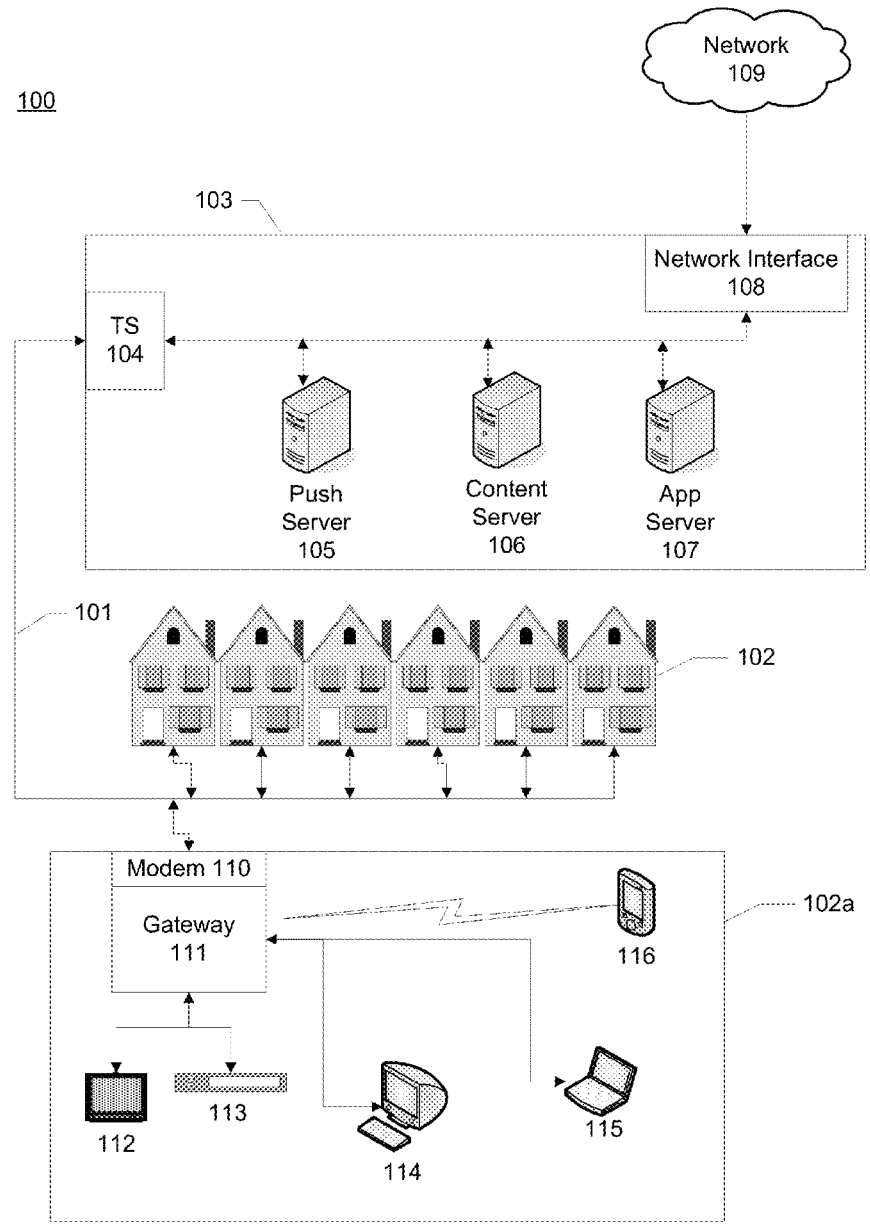
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, optical fiber network, coaxial cable network, and/or a hybrid fiber/coax distribution network. Such networks 100 may use a series of interconnected communication lines 101 (e.g., coaxial cables, optical fibers, wireless, etc.) to connect an end-point to a central office or headend 103. Example end-points are illustrated in FIG. 1 as premises 102 (e.g., businesses, homes, consumer dwellings, etc.) The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS), which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various homes 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102.

An example home 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem or similarly functioning device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
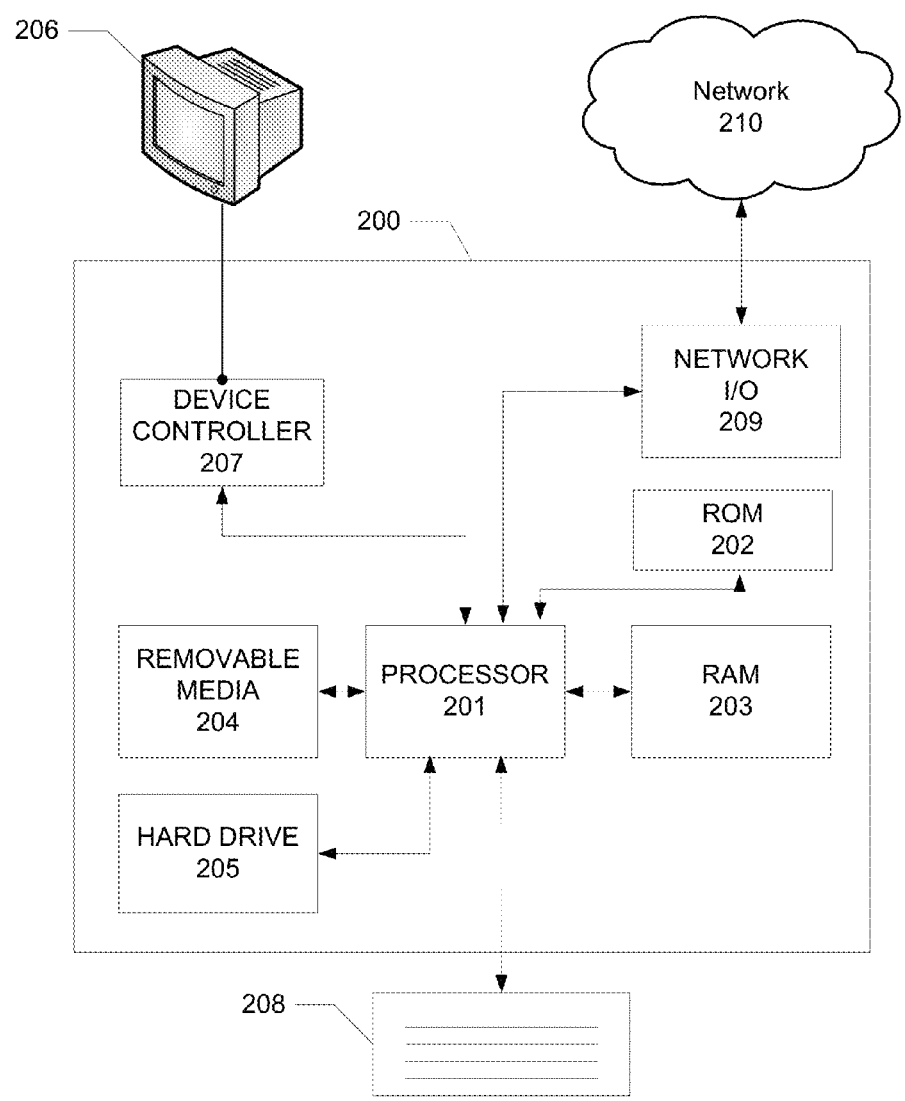
FIG. 2 illustrates an example hardware platform on which at least some of the various elements described herein can be implemented.

FIG. 2 illustrates an example hardware platform on which at least some of the various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines of the networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Various features described herein relate to monitoring and using telemetry information. With respect to FIG. 1, such monitoring and using may include communications between one or more downstream devices (e.g., devices of one or more of premises 102, MTS 104) and one or more servers of the central office 103 (e.g., application server 107). For example, messages that include telemetry information may be transmitted from a device of premise 102a (e.g., gateway 111) to a server of the central office 103 configured to manage the telemetry information, so that the telemetry information for the premise 102a can be monitored at the central office 103. In some embodiments, the telemetry information can be monitored, analyzed, and/or used to determine information related to operation and use of the distribution network.

Telemetry information generally refers to information that is related to various conditions of a distribution network. For example, telemetry information may refer to status information of a particular device, such as a gateway device. Status information of a particular device may include bit rates (e.g., the bit rate of information received at the gateway device), address information (e.g., an Internet Protocol address of the gateway device), status of one or more services operating on the device (e.g., status of a video-on-demand service currently operating on the gateway device), etc. As another example, telemetry information may refer to operating conditions of the distribution network, such as bit-rates, network congestion, packet loss, etc. Details of telemetry information, including details of the above mentioned telemetry information, and others, will be discussed below.

Figure 3:
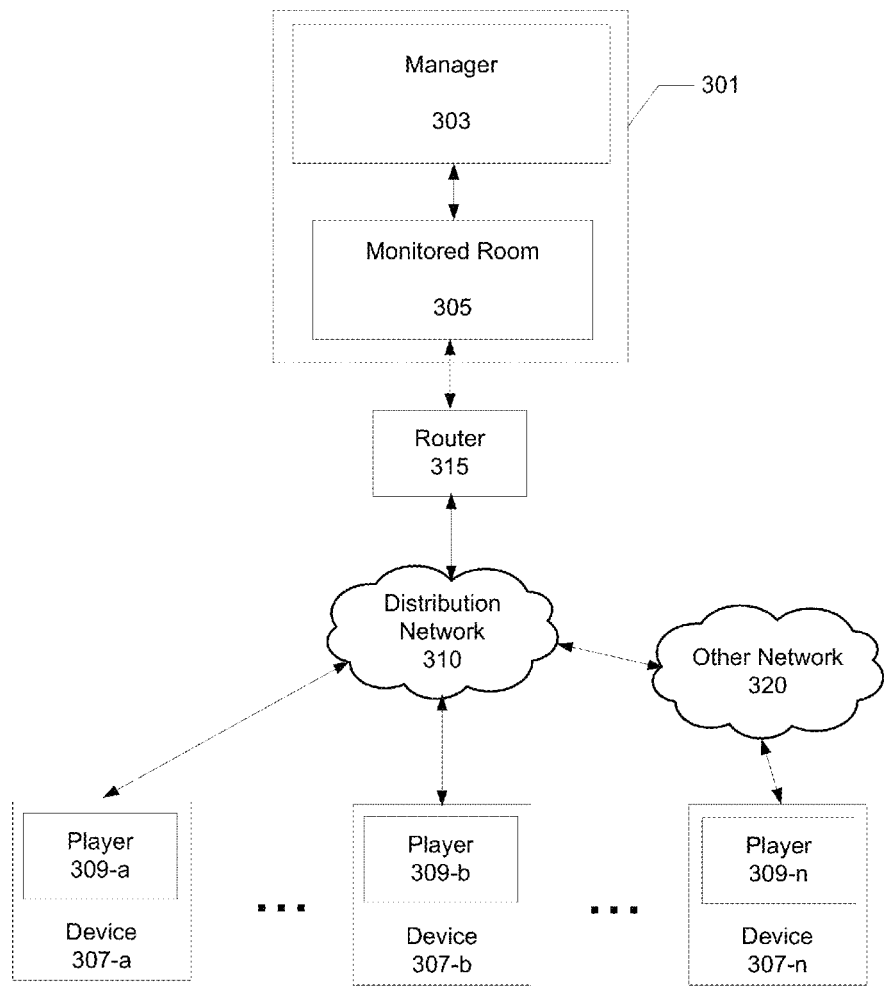
FIG. 3 illustrates an example system for monitoring telemetry information and using the telemetry information according to one or more aspects described herein.

FIG. 3 illustrates an example system for monitoring telemetry information and using the telemetry information. In some embodiments, the example system may be used to monitor and/or use the telemetry in real time.

As illustrated in FIG. 3, the example system includes a management server 301 (e.g., application server 107 of FIG. 1), a distribution network 310 (e.g., distribution network 100 of FIG. 1), other network 320 (e.g., the Internet, a third party network, etc.), and a plurality of downstream devices 307-a, 307-b, 307-n, etc. (e.g., gateway 111, STB 113, television 112, personal computer 114, laptop computer 115, wireless device 116 of FIG. 1, etc.). In some arrangements, the management server 301 may include one or more managers (e.g., manager 303) and/or one or more monitored rooms (e.g., monitored room 305). Downstream devices may include one or more players (e.g., players 309-a, 309-b, 309-n, etc.). The players, managers and devices of the example system may communicate with other devices, players and managers of the example system. Additionally, particular devices of the distribution network may be capable of transmitting signals to one or more of the downstream devices, such as router 315.

In some embodiments, a manager may be a software application executing on a server (e.g., manager 303 executes on management server 301). In some embodiments, managers may be configured to transmit commands to one or more of players/downstream devices via a monitored room. Additionally and/or alternatively, managers may also be configured to monitor telemetry information and use the telemetry information in various ways. For example, a manager can be configured to monitor telemetry information in order to determine and/or identify information that is relevant to the manager. In one example, a video service manager may monitor the telemetry information to determine whether video services are operating correctly to various end-point devices.

Video services can operate incorrectly when a network problem (e.g., a service problem) is occurring in the distribution network. A network problem can be the result of an issue occurring at any point throughout the distribution network. For example, in some embodiments, a content provider may transmit content and/or services using many different data streams. These data streams may be multiplexed together using one or more frequency bands. In some instances, particular frequency bands may be reserved for particular services (e.g., frequency band X is reserved for data streams of premium television programming, such as HBO®, HBO®2, etc., while frequency band Y is reserved for data streams of a video-on-demand service or an electronic program guide service, while frequency band Z is reserved for a linear content service, etc.). A downstream device may receive the data streams and decode one or more particular data streams from the received streams. Content carried on one of the particular data streams may be viewed on a display device, such as a television or the like. These data streams, however, pass through many different devices and/or transmission media before it reaches the downstream device and/or the display device. If the devices and/or transmission media are performing improperly and/or unexpectedly, or certain network events are occurring (e.g., network congestion, high usage of communication lines, etc.), a user could be experiencing problems viewing and/or interacting with a service (e.g., packet loss, low bitrates, service outages, reduced quality of received content fragments, buffering events, etc.).

For example, an improperly or unexpectedly performing device may not transmit or process service information properly, or may modify the service information causing the information to be improperly received at the user device. In another example, a downstream device may be experiencing reduced quality of received content fragments. The downstream device may detect the reduced quality of the fragments and respond by lowering its bitrate. A downstream device shifting from a higher bitrate to a lower bitrate can be used to identify a network problem, such as a variation in fragment quality level which caused the device to shift to the lower bitrate. In yet another example, the downstream device could be experiencing a buffering event. Some buffering events can cause playback of the content to stall, or otherwise playback improperly. Information related to the device's buffer and/or buffer events detected by the device could be used to identify a network problem, such as a buffer event that caused playback of the content to stall.

The location of the improperly performing device and/or transmission media in the distribution network can be a factor in the impact on the user base of the content provider's services. For example, network problems may be specific to a downstream device or a user (e.g., a problem specific to a single user device), a particular geographic area such as a neighborhood or metro area (e.g., a problem with a MTS, encoder, fragmenter, server, router, or other device of the distribution network), etc. Indeed, a network problem may be the result of a defective device upstream of the user device, downstream from the central office, at the central office, and/or at the premise of the user device. For example, router 315 may be malfunctioning and causing the downstream devices to experience a network problem. Some of the network problems that can be identified by a video service manager include a low bit rate, packet loss, etc. Upon identifying a network problem, the video service manager may notify the content provider of the identified problem, such as by transmitting information identifying the problem to a database of the content provider (e.g., a report that includes information related to the identified problem).

In other examples, managers may be configured to monitor telemetry information to identify information relevant to operational, business and/or engineering needs. In one instance, an advertisement manager may be configured to monitor the telemetry data in order to identify information related to advertising, such as ad insertion, ad playback, user interaction with an advertisement, etc. In another example, an engineering manager may be configured to monitor the telemetry data to determine large-scale network issues affecting multiple end-point devices, such as wide-spread low bit rates, packet loss, network congestion, etc. Details of these managers, and others, will be discussed below. Generally, a manager can be configured to monitor any combination of telemetry information. Some other examples include managers configured to monitor for router/network topology events, distribution network health information, unexpected error events, encoder issues, issues with content flowing into the encoders, issues with fragmenters, issues with the multi-bitrate content received by the fragmenters from the encoders, etc.

The managers may also be configured to issue commands related to the type of telemetry information each manager monitors. For example, a video service manager may issue commands to help in detecting and/or diagnosing video service network problems (e.g., issue commands to change bitrates, play certain content, etc.). As another example, an advertisement manager may issue commands related to advertisements, such as a command causing a device to play a certain advertisement. As yet another example, an engineering manager may issue commands to assist in detecting and/or diagnosing large-scale network issues, or the like.

One source of the telemetry information for a manager can be a monitored room, such as a chat room. A monitored room may be a software application executing on the management server 301 (e.g., monitored room 305 is executing on management server 301). Monitored rooms, along with the managers, may provide a scalable signaling and telemetry information gathering mechanism that is between downstream devices and existing tools of a content provider's central office (e.g., customer service tools, engineering tools, other organization tools, etc.) For example, these monitored rooms/chat rooms can allow for any number of managers to monitor information posted in the rooms from any number of players and/or managers. Any manager can extract information from a monitored room. Upon extracting information from a room, the manager may perform additional analysis and/or processing on the extracted information, such as summarizing the information and creating another message. These additional messages could be posted to other monitored rooms, or sent to other systems of the content provider.

Another source of telemetry information could be information received from other monitoring tools utilized by the content provider. For example, monitoring tools could include tools that monitor for service degradation and outages for video-on-demand services, linear services, other data services, web servers, etc. Various different monitoring systems can be used including iVMS®, Nagios®, etc. Information produced by the monitoring tools can be converted into messages compatible with the monitored rooms (e.g., into an XMPP message) and transmitted to the monitored room.

In some illustrative embodiments, a monitored room can receive telemetry information from members of the monitored room. In some arrangements, a monitored room may be configured to receive and process requests to join the monitored room. The requests to join may be transmitted from players, managers, downstream devices, servers, etc. While joined, members (e.g., player and/or managers) may post information to the monitored room and/or extract information from the room. For example, a player of a downstream device may transmit telemetry information to the monitored room and a manager may monitor the room for relevant telemetry information and extract the relevant information for further processing. In some embodiments, a manager may be monitoring the telemetry information of a plurality of monitored rooms (e.g., manager 303 may monitor the telemetry information of monitored room 305 and at least one additional monitored room). At a given instance, a monitored room may have a plurality of members, including one or more managers and one or more players. Additionally, a monitored room may be associated with a user interface that allows an operator of the content provider to view the messages transmitted to the monitored room (e.g., telemetry information messages, commands, etc.). In some arrangements, the user interface may operate on the management server that includes the monitored room (e.g., management server 301 of FIG. 3).

In some arrangements, monitored rooms may be organized such that a monitored room is for a particular purpose (e.g., a particular network problem, such as a video service problem). The management server(s) may store information identifying the currently available monitored rooms and/or the particular purposes of the monitored rooms. The stored information may be transmitted to the downstream devices.

Telemetry information may be transmitted to a monitored room by one or more players (e.g., player 309-*a*, 309-*b*, 309-*n*, etc., of FIG. 3). A player may be a software application executing on a downstream device (e.g., player 309-*a* may be executing on downstream device 307-*a*, which may be a gateway interface device). For example, a player may be a media or video player of the downstream device, or some other software application and/or process operating on the downstream device (e.g., a screen-saver application, a chat messaging application, etc.). A player may be configured to transmit requests to join monitored rooms, gather telemetry information at the downstream device, and/or transmit the gathered telemetry information to one or more monitored rooms. Additionally, in some arrangements, the player may perform its various functions without knowledge of the user. For example, no messages related to the functions of the player are displayed to a user. Instead, the joining of monitored rooms, the gathering and transmitting of telemetry information, etc. may be performed automatically, such as in the background of the downstream device's operating system.

In some embodiments, a player may be configured to operate according to a plurality of different modes of operation. For example, a player may be configured to operate in a two-way mode that enables the processing of commands received from a manager via a monitored room. Commands may cause the downstream device to perform specific actions, such as decode a specific service, process the service, pause, report status, automatically modify trace settings, and/or transmit telemetry information, etc. In some arrangements, when operating in the two-way mode, a player may request to join monitored rooms, gather and transmit telemetry information, process commands, etc. As another example, a player may be configured to operate in a one-way mode that disables the processing of commands received from a manager via a monitored room. In some arrangements, when operating in the one-way mode, a player may request to join monitored rooms, gather and transmit telemetry information, etc. In some embodiments, when operating in the one-way mode, a player may be able to process only particular commands, such as a mode change request. In some instances, the particular commands that the downstream device can process while operating in the one way mode of operation may be received directly from a manager and/or bypass the monitored rooms. Details of the different modes and the commands will be discussed below.

The managers, players and monitored rooms may communicate with each other. In some embodiments, the managers, player and rooms may communicate with each other using a messaging protocol, such as a protocol used in an chat messaging service, instant messaging service, voice over Internet Protocol service, real-time text-based communication services, and/or file transfer signaling. Additionally and/or alternatively, in some arrangements, the managers, players and rooms may communicate with each other using Internet protocol (IP) based messaging technologies.

Some messaging protocols and/or technologies may allow for the collection of information (e.g., telemetry information) by a system of a content provider's central office. The gathered information could come from user devices, or other devices of the distribution network, such as router information and other distribution network information. This system may be able to analyze and/or correlate the gathered information, determine whether network problems exist within the distribution network (e.g., a root cause of the problem and/or a scope of the problem), and react to the determination that a network problem exists. In some arrangements, the system could attempt to proactively notify other systems of the content provider and/or the downstream devices of the network problem.

In one or more illustrative embodiments, the managers, players, and rooms may communicate using Extensible Messaging and Presence Protocol (XMPP). XMPP is based on Extensible Markup Language (XML), and uses a decentralized client-server model that allows the clients (e.g., the players and managers) to communicate with each other via an XMPP server (e.g., management server 301 of FIG. 3). In some instances the managers and players and rooms may utilize a modified version of XMPP (e.g., via an XMPP extension) to provide custom functionality to gather, monitor and/or use the telemetry information. In one example, the managers and players and rooms of the system use an extended version of XMPP that defines additional actions (e.g., messages, commands, etc.) and syntax for the actions that can be commonly understood by the managers and players and rooms. The Jabber protocol, which is related to XMPP, is another example of a protocol that can be used by the managers, players and rooms to communicate. Message oriented middleware (MOM) or similar technologies are other examples that can be used by the managers, players and rooms to communicate.

In some embodiments utilizing XMPP for messaging, a monitored room may perform functions similar to an XMPP server. In one such embodiment, a monitored room receives XMPP messages (or messages of an extended version of XMPP, etc.) from managers and players that have joined the room. The monitored room may forward the messages to the other managers and players to simulate a chat room, which allows the joined managers and players to "see" and process the messages sent to the monitored room (e.g., via a user interface). The messages can include both commands and telemetry information messages.

In some illustrative embodiments utilizing XMPP, manager or player may have its own unique identifier (e.g., Jabber ID). In one or more arrangements, the unique identifier may be structured similar to an e-mail address. For example, the unique identifier may include a username (e.g., "client-player307-a") and a domain name, such as a geographical domain (e.g., zip code, city name, state name, etc.) and/or a downstream device address (e.g., a device's IP address, and/or other device identifier, such as an MTS identifier). In some arrangements, the username and domain name may be separated by one or more symbols, such as an "@" symbol. In one example, an XMPP unique identifier for a particular downstream device/player (e.g., player 309-*a* of FIG. 3) may be a "client-player309-a@1.1.100.101" character string. Other identifiers can be used. For example, the unique identifier may include a name (e.g., "jvd-mac-home", "bf-laptop", etc.) and/or a portion of the XMPP unique identifier (e.g., "a05ce8b0" where the unique identifier is "a05ce8b0@nh", "45c9aa4b" where the unique identifier is "45c9aa4b@nh", etc.).

Figure 4A:
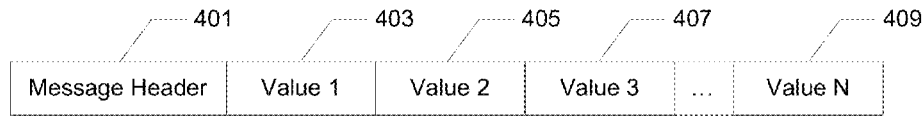
FIG. 4A illustrates an example structure of a telemetry information message according to one or more aspects described herein.

FIG. 4A illustrates an example structure of a telemetry information message. Generally, telemetry information messages include the telemetry information gathered at the downstream device. As will be discussed in more detail below, these messages may be monitored and/or used by the managers. In some arrangements, a telemetry information message may be an XMPP-like message sent from a player to a monitored room. As illustrated in FIG. 4, a telemetry information message may include a message header portion 401 and one or more values (e.g., value 1 403, value 2 405, value 3 407, value N 409, etc.). The message header portion 401 may include various data fields, such as a data field that identifies a source of the message (e.g., a player identifier, such as an Internet Protocol (IP) address, XMPP unique identifier, etc.), and/or a telemetry information message type field. A telemetry information message may be one of various types. For example, one telemetry information message type may be a response message type. A response message may be transmitted (e.g., by a player, downstream device, etc.) in response to a command that requests various telemetry information (e.g., a status command). Another example of a telemetry information message type may be an unsolicited message type. An unsolicited message may be transmitted (e.g., by a player, downstream device, etc.), when the telemetry information message is not being transmitted in response to a command. In some arrangements, for example, a player may transmit telemetry information according to a schedule (e.g., a schedule based on time of day, a periodic transmission schedule, etc.). The telemetry information messages transmitted in accordance with this schedule may be unsolicited messages.

The telemetry information message type field may identify the type, include one or more separation characters, and/or include additional information related to the type. Separation characters can include characters such as punctuation characters (e.g., ':', '::', ',', '/', etc.). An unsolicited message may be identified by including an "unsolicited" character string in the type field. In one example, the telemetry information type field for an unsolicited message may include an "unsolicited/" character string. A response message may be identified by including a "response" character string in the type field. Additional information related to the type may include a command identifier and/or one or more command parameters to identify the command that response message is in response to. In one example, the telemetry information type field for a response message that is in response to a status message requesting a brief status message may include a "response/status:brief/" character string. In another example, the telemetry information type field for a response message that is in response to a status message requesting a full status message may include a "response/status:full/" character string.

In some embodiments, the value field of a telemetry information message (e.g., value field 403 of FIG. 4A) may include a value portion and/or a label portion. In some embodiments, the value and label portions may both include one or more alphanumeric characters. Additionally, the value field may include one or more separation characters (e.g., punctuation characters, such as ':', '::', ',', '/', etc.). A value portion of a value field may include the telemetry information gathered by a downstream device, such as values representing events, traces, operating conditions and the like of the downstream device. In some arrangements, each value portion of the telemetry information message may represent a single datum of telemetry information (e.g., a single event, a single datum of trace data, a single operating condition, etc.). A label portion of a value field may include information that identifies the telemetry information included in an associated value portion (e.g., identifying the event, trace datum, operating condition, etc. of the value portion included in the same value field). In some instances, the labels may allow for the values to be parsed from the telemetry information messages. Various types of label portions and values may be defined for inclusion into a telemetry information message. For example, a telemetry information message may include, among others, one or more of the following types of value fields.

A revision field: the value portion of a revision field may identify a client revision number, such as a revision number of the downstream device, and/or a revision number of the player of the downstream device. The label portion may be an identifier such as a "rev=" character string. An example revision field may be a "rev=1.3" character string.

An address field: the value portion of an address field may identify an address, such as an IP address, of the downstream device. The label portion may be an identifier such as an "ip=" character string. An example revision field may be an "ip=1.100.9.43" character string.

A play status field: the value portion of a play status field may identify a current state of the device, such as whether a content asset (e.g., the asset of the current manifest) is stopped, paused, playing, etc. The label portion may be an identifier such as a "playerstate=" character string. An example play status field that identifies a stopped state of the device may be a "playerstate=Stopped" character string. An example play status field that identifies a paused state of the device may be a "playerstate=Paused" character string. An example play status field that identifies a playing state of the device may be a "playerstate=Playing" character string.

A video playback rate field: the value portion of a video playback rate field may identify a rate of playback of the device, such as the bitrate of the encoded video of the current manifest (e.g., programming for a particular "channel" such as NBC, video-on-demand asset, etc.). The video playback rate may be represented in different units, such as kilobits per second, megabits per second, etc. The label portion may be an identifier such as a "videobw=" character string. An example video playback rate field that identifies a bitrate of 32 kilobits per second may be a "videobw=32 kb" character string.

An audio playback rate field: the value portion of an audio playback rate field may identify another rate of playback of the device, such as the bitrate of the encoded audio of the current manifest. Similar to the video playback rate, the audio playback rate may be represented in different units, such as kilobits per second, megabits per second, etc. The label portion may be an identifier such as an "audiobw=" character string. An example video playback rate field that identifies a bitrate of 1 megabits per second may be an "audiobw=1 mb" character string.

A manifest field: the value portion of a manifest field may identify the current manifest, such as the currently decoded service or some other service identifier. In some arrangements, the value portion of a manifest field may identify the current manifest by an address, such as an address of the content asset being consumed at the downstream device (e.g., an IP address or the like), and/or a file location of the content asset being consumed at the downstream device (e.g., a URL of the manifest file being used to locate/fetch the currently consumed content asset, a URL of the currently consumed content asset file, etc.). The label portion may be an identifier such as a "manifest=" character string. An example manifest field may be a "manifest=http://service.lab.bdn.xcal.tv/Manifest" character string.

A fullscreen status field: the value portion of a fullscreen status field may identify whether current content asset/manifest is being displayed using a fullscreen. The label portion may be an identifier such as a "fullscreen=" character string. An example fullscreen status field that identifies fullscreen display may be a "fullscreen=True" character string. An example fullscreen status field that identifies a non-fullscreen (e.g., windowed) display may be a "fullscreen=False" character string.

A message field: the value portion of a message field may include textual notes or other information to a chat room that provide additional details on the operation of the device. In some arrangements, a user could be able to select the text that is included in the message field (e.g., from a pull down menu, or a text input user interface). For example, a user could enter details on what they are experiencing, such as "video reception is abnormal" or "audio keeps turning off", etc. The label portion may be an identifier such as a "message=" character string. An example message field may be a "message=audio keeps turning off" character string.

Other value fields may be defined dependent on the trace capabilities of the player and/or downstream device. For example, as will be discussed in detail below, the downstream device may have trace settings that are modifiable by commands sent from a manager. The trace settings may be modifiable according to different trace areas (e.g., commands may cause one or more trace areas to be activated or de-activated). Each trace area may relate to particular operations, events, etc., of the downstream device. A telemetry information message may include one or more value fields related to the active trace areas. The value fields related to the active trace areas may be similar to the above described value fields (e.g., they include a value portion and a label portion, etc.). In one example, one possible trace area may be related to advertisement trace area. When the advertisement trace area is active, a telemetry information message may include a value field identifying an advertisement that was played at the downstream device (e.g., "ad_id=1234"). In another example, when the advertisement trace area is active, a telemetry information message may include a value field identifying that an interactive advertisement application was used, and/or the length of time (e.g., in minutes) the user interacted with the advertisement (e.g., "ad_app=42" and/or "ad_app_time=14.321").

In another example, the trace areas may be related to a streaming protocol used within the system. The streaming protocol may have defined various debugging tools that can trace information and/or conditions of a datastream using the protocol. One example protocol is Microsoft Smooth Streaming. In one instance, the trace areas that can be activated include the different traces of the protocol's debugging tools.

Figure 4B:
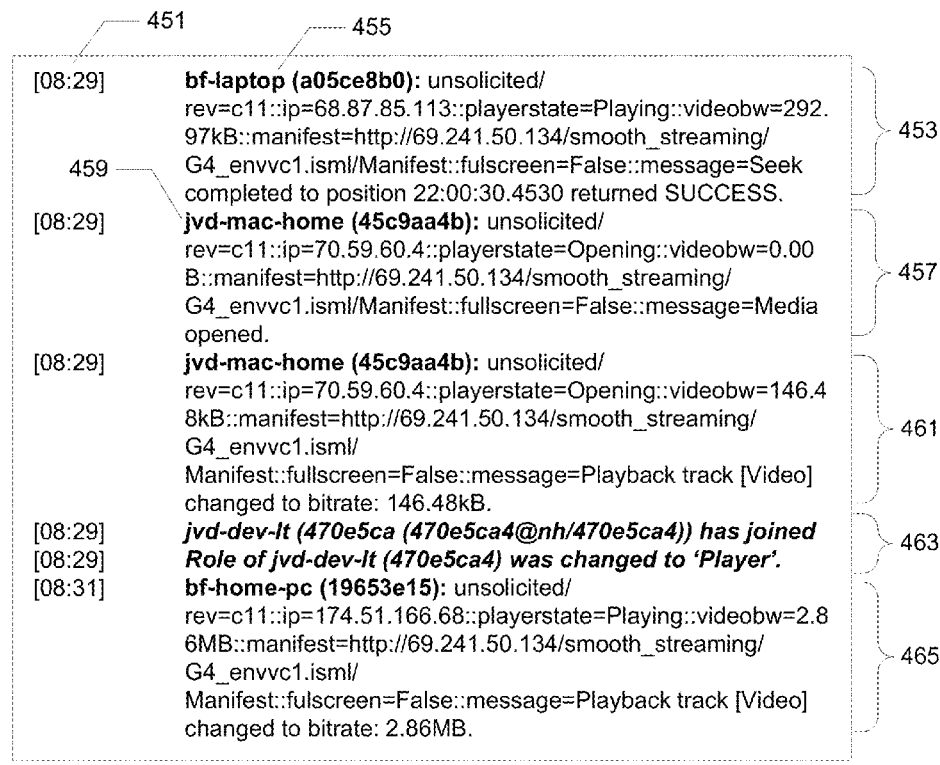
FIG. 4B illustrates an example chat room display for a monitored room that includes different telemetry information messages according to one or more aspects described herein.

FIG. 4B illustrates an example chat room display for a monitored room that includes different telemetry information messages. This example chat room display is an illustration of information sent to a monitored room (e.g., posted to the monitored room). As illustrated, the monitored room has multiple players joined to the room (e.g., players identified in the illustration in part by "bf-laptop", "jvd-mac-home", "jvd-dev-lt", "bf-home-pc", etc.) and multiple telemetry information messages posted by the players to the monitored room (e.g., messages 453, 457, 461, 465, etc.). Each message is associated with a time code, such as time code 451, and each message is associated with information identifying the source of the message (e.g., the player or manager). For example, telemetry information message 453 was sent from the player identified by identifying information 455 (e.g., "bf-laptop (a05ce8b0)"). Telemetry information message 457 was sent from the player identified by identifying information 459 (e.g., "jvd-mac-home (45c9aa4b)"). The messages may describe different states, operating conditions, etc., of the player. For example, message 453 includes, among other things, a video playback rate field (e.g., "videobw=292.97 kB"), and a message field that indicates a seek operation was completed. As another example, message 465 includes, among other things, a play status field indicating that video is currently playing (e.g., "playerstate=Playing"), and a message field indicating that the playback rate has been changed to 2.86 MB. Also illustrated by FIG. 4B is information related to when a player or manager joins the monitored room. Specifically, information 463 is information for a player that has just joined the monitored room. The monitored room could also include information (not shown) related to when a player or manager leaves the monitored room.

Figure 5:
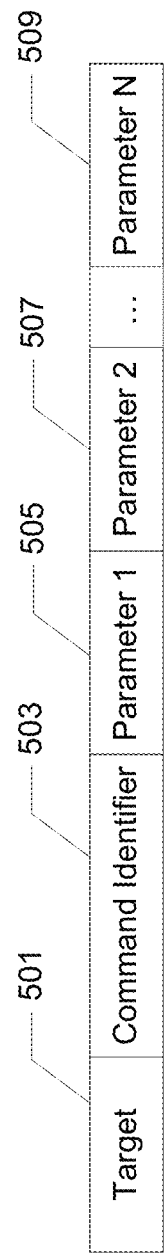
FIG. 5 illustrates an example structure of a command according to one or more aspects described herein.

FIG. 5 illustrates an example structure of a telemetry information command. Commands may allow a content provider, via a manager and/or monitored room, to interact with a downstream device so that the downstream device operates in accordance with commands. In some arrangements, such interaction may allow a content provider to actively troubleshoot issues. Additionally, in some embodiments, commands may be sent from a manager to a downstream device either directly from the manager, or indirectly via a monitored room. In some arrangements, a command may be a XMPP-like message sent to a monitored room. As illustrated in FIG. 5, commands may include a target portion 501, a command identifier portion 503, and/or one or more parameters (e.g. parameter 1 505, parameter 2 507, parameter N 509, etc.).

The target portion 501 may include a data field (e.g., an alphanumeric string of characters) that identifies a destination of the command (e.g., a player identifier, such as an Internet Protocol (IP) address, XMPP unique identifier, a device group identifier, etc.). The command identifier field 503 may include a data field that identifies a defined command that the destination device can process. The number of parameter fields included in the command may be based on the command identifier (e.g., a first command may require one parameter, a second command may require two parameters, a third command may require zero parameters, etc.). One or more separation characters may be included between the various portions of the command (e.g., punctuation characters such as ':', '::', ',', '/', etc.). A plurality of commands may be defined. For example, one or more commands, among others, may be defined.

A play command: a play command may cause the downstream device to start playing according to the device's current manifest. An example command identifier may be a "play" character string. In some arrangements, a play command may not require any parameters. An example play command that is directed towards a particular downstream device (e.g., player 309-*a* of FIG. 3) may be a "client-player309-a@1.1.100.101:play" character string. An example play command that is directed towards all downstream devices that are joined in a monitored room may be an "all:play" character string.

A stop command: a stop command may cause the downstream device to stop playing. An example command identifier may be a "stop" character string. In some arrangements, a stop command may not require any parameters. An example stop command that is directed towards a particular downstream device (e.g., player 309-*a* of FIG. 3) may be a "client-player309-a@1.1.100.101:stop" character string. An example stop command that is directed towards all downstream devices that are joined in a monitored room may be an "all:stop" character string.

A fast-forward command: a fast-forward command may cause the downstream device to begin fast-forwarding through current content. An example command identifier may be a "forward" character string. In some arrangements, a fast-forward command may not require any parameters. In others, a fast-forward command may include a particular time-code that the device is to fast-forward to in the current content. An example fast-forward command that is directed towards a particular downstream device (e.g., player 309-*a* of FIG. 3) may be a "client-player309-a@1.1.100.101:forward" character string. An example fast-forward command that is directed towards all downstream devices that are joined in a monitored room may be an "all:forward" character string.

A rewind command: a rewind command may cause the downstream device to begin rewinding through current content. An example command identifier may be a "rewind" character string. In some arrangements, a rewind command may not require any parameters. In others, a rewind command may include a particular time-code that the device is to rewind to in the current content. An example rewind command that is directed towards a particular downstream device (e.g., player 309-*a* of FIG. 3) may be a "client-player309-a@1.1.100.101:rewind" character string. An example rewind command that is directed towards all downstream devices that are joined in a monitored room may be an "all:rewind" character string.

A return-to-live command: a return-to-live command may cause the downstream device to return to live content of the current content (e.g., the portion of a television show currently being broadcast over a television "channel", etc.). An example command identifier may be a "live" character string. In some arrangements, a return-to-live command may not require any parameters. An example return-to-live command that is directed towards a particular downstream device (e.g., player 309-*a* of FIG. 3) may be a "client-player309-a@1.1.100.101:live" character string. An example return-to-live command that is directed towards all downstream devices that are joined in a monitored room may be an "all:live" character string.

A manifest load command: a manifest load command may cause the downstream device to load a manifest file. An example command identifier may be a "manifest" character string. In some arrangements, a manifest load command may require one parameter, such as a parameter identifying the manifest file to load. An example manifest load command that is directed towards a particular downstream device (e.g., player 309-*a* of FIG. 3) may be a "client-player309-a@1.1.100.101:manifest:manifest_location_address/manifest_filename" character string. An example manifest load command that is directed towards all downstream devices that are joined in a monitored room may be an "all:manifest:manifest_location_address/manifest_filename" character string.

A fullscreen command: a fullscreen command may cause the downstream device to operate in a fullscreen mode (e.g., display a content asset such as a video asset, a television program, etc., in fullscreen on an associated display). An example command identifier may be a "fullscreen" character string. In some arrangements, a fullscreen command may not require a parameter. An example fullscreen command that is directed towards a particular downstream device (e.g., player 309-*a* of FIG. 3) may be a "client-player309-a@1.1.100.101:fullscreen" character string. An example manifest load command that is directed towards all downstream devices that are joined in a monitored room may be an "all:fullscreen" character string.

A reload command: a reload command may cause the downstream device to reload a page of a browser being executed at the downstream device. An example command identifier may be a "reload" character string. In some arrangements, a reload command may not require a parameter. An example reload command that is directed towards a particular downstream device (e.g., player 309-*a* of FIG. 3) may be a "client-player309-a@1.1.100.101:reload" character string. An example manifest load command that is directed towards all downstream devices that are joined in a monitored room may be an "all:reload" character string.

A status command: a status command may cause the downstream device to respond with a telemetry information message. An example command identifier may be a "status" character string. In some arrangements, a status command may require one parameter, such as a verbosity level identifier. For example, a "brief" character string parameter may cause the downstream device to respond with a telemetry information message that includes information such as the downstream device's revision number, IP address, a play state identifier, one or more bitrates, a current manifest identifier, a fullscreen status identifier, etc. As another example, a "full" character string parameter may cause the downstream device to respond with a telemetry information message that includes the same information as the device would include in its response to the "brief" status command (e.g., the downstream device's revision number, IP address, a play state identifier, one or more bitrates, a current manifest identifier, a fullscreen status identifier, etc.), as well as additional information related to the downstream device. An example "brief" status command that is directed towards a particular downstream device (e.g., player 309-*a* of FIG. 3) may be a "client-player309-a@1.1.100.101:status:brief" character string. An example "brief" status command that is directed towards all downstream devices that are joined in a monitored room may be an "all:status:full" character string. An example "full" status command that is directed to a particular downstream device may be a "client-player309-a@1.1.100.101:status:full" character string. An example "full" status command directed towards all downstream devices that are joined in a monitored room may be an "all:status:full" character string.

A trace command: a trace command may cause the player and/or downstream device to change trace settings. For example, a trace command may cause the downstream device to activate one or more trace areas of the downstream device's diagnostic and/or debugging tools. Additionally, a trace command may cause the downstream device to change and/or set a verbosity level associated with a trace area. An example command identifier may be a "trace" character string. In some arrangements, a trace command include at least two parameters. For example, a trace command may include a first parameter identifying a trace area to activate and a second parameter identifying a verbosity level for the trace area. In some arrangements, a trace command may include additional parameters identifying additional trace areas to activate and additional verbosity levels for the additional trace areas.

A plurality of different verbosity levels is possible. For example, a first verbosity level may cause the downstream device to transmit different (e.g., less) telemetry information related to a particular active trace area than would be transmitted under another verbosity level. In some arrangements, a downstream device may be configured to transmit telemetry information for a particular active trace area according to six different verbosity levels, such as an assertion level (e.g., identified by a verbosity level identifier such as a "Assertion" character string), an error level (e.g., identified by a verbosity level identifier such as a "Error" character string), a fatal error level (e.g., identified by a verbosity level identifier such as a "Fatal" character string), an informational level (e.g., identified by a verbosity level identifier such as a "Informational" character string), a verbose level (e.g., identified by a verbosity level identifier such as a "Verbose" character string), a warning level (e.g., identified by a verbosity level identifier such as a "Warning" character string), etc. The appropriate verbosity level identifier may be included as a parameter in the trace command.

A plurality of different trace areas is possible. Each trace area may relate to a particular operation, event, status, etc., of the downstream device. Additionally, each trace area may be identified by its own trace area identifier. For example, a trace command may cause the downstream device to activate one or more trace areas related to the operation of the downstream device. One trace area related to the operation of the downstream device may be an advertisement related trace area. Activating an advertisement trace area may cause the downstream device to transmit telemetry information related to advertising, such as indications that an advertisement was played at the downstream device and/or indications that an interactive advertisement application was used. In one instance, an advertisement trace area may be identified by a trace area identifier such as an "AdsInsert" character string.

Other possible trace areas may include trace areas related to media asset consumption events and status (e.g., asset consumption trace areas), such as information related to content packets and the processing of content packets. Yet other possible trace areas may include trace areas related to network operations (e.g., network operation trace areas), such as information related to network get requests and received responses to the network get requests. Yet other possible trace areas may include trace areas related to various events and operations of the device (e.g., operational trace areas), such as information related to logging operations of the device, statistics of the device's operation, etc. Some example trace area identifiers are "ReportFragmentDetails", "ReportMBRChanges", "ReportDownloadTimes", etc. Additionally, another possible trace area causes the downstream device to activate all tracing areas (e.g., activate all tracing area).

An example trace command that is directed towards a particular downstream device (e.g., player 309-*a* of FIG. 3) may be a "client-player309-a@1.1.100.101:trace:AdsInsert::Assertion" character string. An example trace command that is directed towards all downstream devices that are joined in a monitored room may be an "all:trace:Manifest::Warning" character string.

A de-activate trace command: a de-activate trace command may cause the downstream device de-activate all active traces. An example command identifier may be a "traceoff" character string. In some arrangements, a de-activate trace command may not require a parameter. An example de-activate trace command that is directed towards a particular downstream device (e.g., player 309-*a* of FIG. 3) may be a "client-player309-a@1.1.100.101:traceoff" character string. An example manifest load command that is directed towards all downstream devices that are joined in a monitored room may be an "all:traceoff" character string.

Figure 6A:
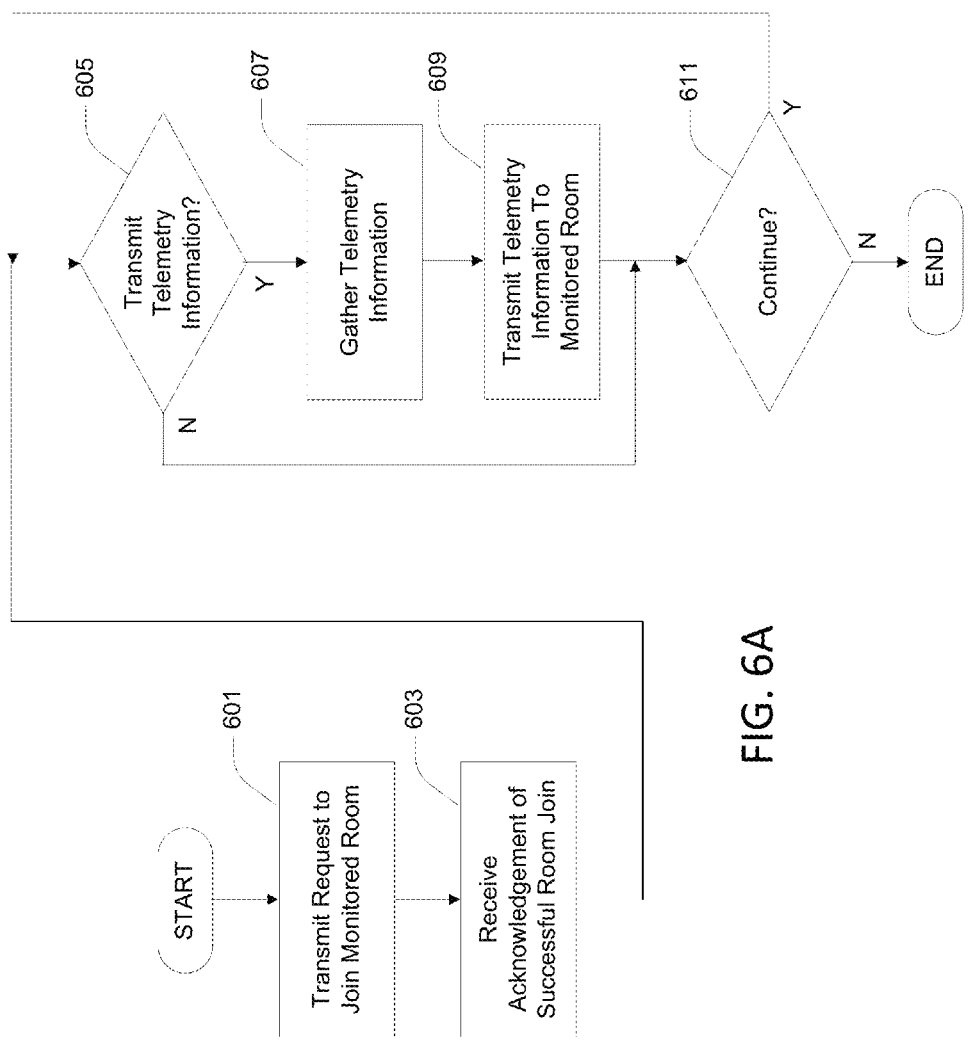
FIG. 6A illustrates an example method for monitoring and transmitting telemetry information at a downstream device according to one or more aspects described herein.

FIG. 6A illustrates an example method for monitoring and transmitting telemetry information at a downstream device. In some embodiments, the downstream device may perform the example method illustrated in FIG. 6A via a player (e.g., player 309-*a* of FIG. 3). At step 601, a player may transmit a request to join a monitored room (e.g., player 309-*a* of FIG. 3 transmits a request to join monitored room 305 of FIG. 3 to monitored room 305). The request to join a monitored room may include information related to a downstream device, player, monitored room, management server, manager, etc. For example, in some embodiments, the request to join a monitored room may include information identifying the downstream device (e.g., a media access control (MAC) address, internet protocol address, etc., of device 307-*a* of FIG. 3) and/or the player (e.g., an XMPP unique identifier of player 309-*a* of FIG. 3, such as "playerentity309-a@100.1.168.1"). Additionally and/or alternatively, the request to join a monitored room may include information identifying a management server (e.g., an internet protocol address of management server 301 of FIG. 3), a manager (e.g., an identifier, such as an XMPP unique identifier, of manager 303 of FIG. 3), and/or a monitored room (e.g., an identifier of a monitored room 301 of FIG. 3). In one example, the request to join a monitored room may include information identifying a particular monitored room that the player requests to join. In some arrangements where the request identifies a particular monitored room (e.g., a pre-determined monitored room). Additionally, in some embodiments, the request to join may not include an identification of a particular monitored room.

The player may determine to transmit the request to join a monitored room in various ways. For example, a user may be able initiate the transmission of a request via a user interface of the downstream device. In one example, a user is experiencing a problem (e.g., bad video quality, etc.) and the user may select an option on the user interface (e.g., "automatically troubleshoot") that causes the request to join to be transmitted. In some arrangements, the user interface may allow a user to identify a particular problem that is being experienced. The player may transmit a request that identifies a particular monitored room based on the identified problem. To determine the particular monitored room, the player may analyze a stored monitored room status table (e.g., a stored table identifying the monitored room, an address of the server for the monitored room, and information identifying the purpose of the monitored rooms, etc.) to identify a monitored room that is associated with the identified problem. From the monitored room status table, the information for the request may be extracted (e.g., an identifier of the monitored room, an address of the server, etc.) and the request to join the monitored room may be subsequently transmitted.

In other arrangements, the request to join a monitored room may be transmitted upon initiation of the player on the downstream device. A player may be initiated in various ways. For example, a player may be initiated on the downstream device based on a particular time of day (e.g., off-peak hours, such as early morning), the downstream device powering on, the decoding a particular service (e.g., begin decoding to a video-on-demand service, a program guide service, begin decoding data for a particular television "channel" such as NBC, begin decoding a linear service, etc.), the pressing of a particular button on a downstream device's input device (e.g., pressing a "help" button on a remote control, etc.), etc. Another event and/or state can be when the downstream device remains idle for a particular amount of time and/or when the downstream device begins to execute an idle device process, such as a screen-saver application. In some arrangements the player can be a part of the screen-saver application. In yet another arrangement, the downstream device can start up a player based on the reception of a particular command from a manager (e.g., an activate player command).

At step 603, the player may receive an acknowledgement of a successful room join. The acknowledgement may include information such as a response code for the transmitted request to join a monitored room that indicates that the player was successfully joined to a monitored room. The player may store a listing of monitored rooms that the player has been joined to.

At step 605, the player may determine whether to transmit telemetry information to one or more joined rooms. If the player determines that telemetry information is to be transmitted, the method may proceed to step 607. Otherwise the method may proceed to step 611. The player may perform this determination in various ways. For example, the player may transmit telemetry information periodically to the monitored rooms which the player is joined. In some arrangements where telemetry information is periodically transmitted, the player may determine whether it is time to transmit the telemetry information according to the periodic schedule.

In another example, the player may be configured to transmit telemetry information based on the occurrence of certain events and/or states of the downstream device. In one example where the player transmits telemetry information based on events and/or states, the player may transmit information based on a change in the state of the device (e.g., when a "channel" is changed at the device, when the device moves through a menu structure of a service, such as a video-on-demand service and/or program guide). In some arrangements where telemetry information is transmitted based on a change in the state of the device, the player may determine whether a state change has occurred since the previous telemetry information transmission. As yet another example, the player may transmit telemetry information based on reception of a particular command (e.g., a status request command, etc.).

At step 607, the player may gather telemetry information. For example, for each monitored room the player is to transmit telemetry information to, the player may gather a predefined set of telemetry information that can be inserted into a telemetry information message (e.g., the current device revision number for a revision field, the current device address for an address field, the current play status for a play status field, the current video playback rate for a video playback rate field, the current audio playback rate for an audio playback rate field, the current manifest identifier for a manifest field, the current fullscreen status for a fullscreen status field, etc.). Additionally and/or alternatively, telemetry information may be gathered in accordance with trace settings. For example, the player may analyze the trace settings to identify one or more active trace areas and their corresponding verbosity levels. Then, for each identified active trace setting, additional telemetry information may be gathered according to the verbosity level of the respective active trace area (e.g., advertisement related telemetry information for an active advertisement trace area, etc.). Once gathered, the player may form a telemetry information message (e.g., an XMPP message including the gathered telemetry information) for the respective monitored room using the gathered telemetry information.

The trace settings may include trace areas and/or verbosity levels that are the same as, or similar to, those discussed above with respect to FIG. 5 and the trace command. Additionally, the trace settings may be organized by monitored rooms (e.g., rooms that the player is currently joined to), thereby allowing the player to transmit different telemetry information messages to the different monitored rooms. For example, the downstream may be joined to multiple monitored rooms and the trace settings may include active trace areas and corresponding verbosity levels for each of the joined monitored rooms. The active trace areas and/or the verbosity levels of a first joined monitored room may be different than other active trace areas and/or verbosity levels of another joined monitored room. In one particular instance, a first joined monitored room has only an advertisement trace area active at an "informational" verbosity level, while a second joined monitored room has a network heuristics trace area active at a "warning" verbosity level.

At step 609, the player may transmit the telemetry information to a monitored room. For example, for each monitored room the player is to transmit telemetry information to, the player may transmit the telemetry information message to the respective monitored room using, for example, an XMPP protocol. At step 611, the player may determine whether to continue gathering and transmitting telemetry information. For example, in some embodiments, if the player remains joined to at least one monitored room, the method may proceed to step 605. Otherwise, the method may end. Additionally, in some arrangements, the determination to continue gathering and transmitting telemetry information may include determining whether to leave a monitored room. The determination to leave a monitored room may be based on a state of the downstream device (e.g., is the device decoding the video-on-demand service, the downstream device is no longer in a "help" or "troubleshooting" related service, etc.), and/or based on user input indicating a room should be exited (e.g., a user presses an exit button associated with a joined monitored room). A monitored room may also be exited based on a command received from a manager. If it is determined to leave a monitored room, the player may transmit a message requesting to leave the monitored room.

Figure 6B:
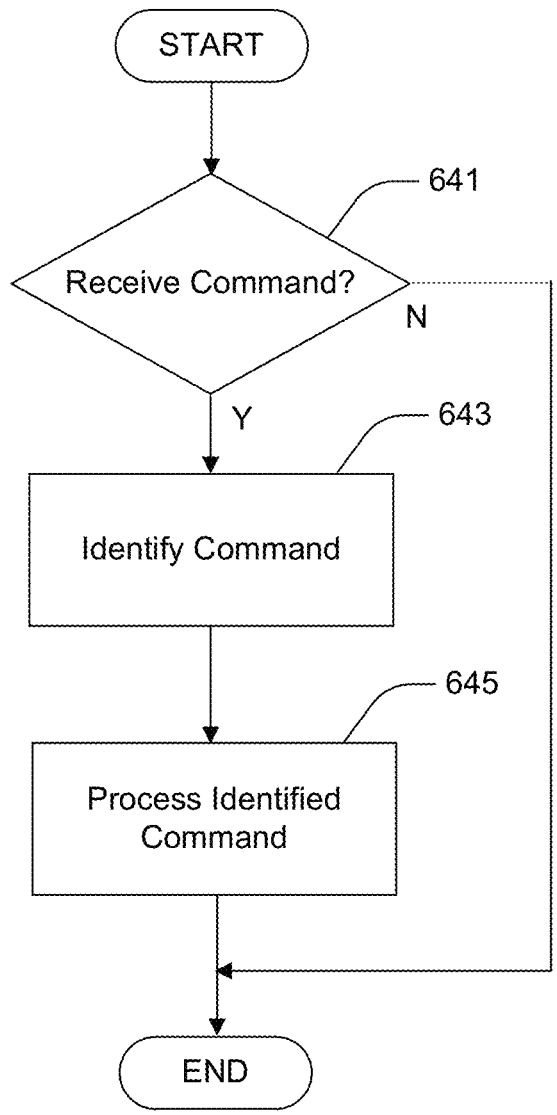
FIG. 6B illustrates an example method for processing a command at a downstream device according to one or more aspects described herein.

FIG. 6B illustrates an example method for processing a command at a downstream device. At step 641, the player may determine whether a command directed to the player and/or downstream device has been received from a manager. In some embodiments, a command may be "posted" in the monitored room. For example, a manager may send a command to a monitored room, and the monitored room may transmit the command to other members of the monitored room (e.g., to the managers and players that have joined the monitored room). The player may monitor messages received from the monitored room for a command directed towards the player and/or downstream device (e.g., a command that identifies the player/downstream device by the XMPP unique identifier in a target field of the command) and/or for a command directed towards all or a group of downstream devices (e.g., a command that includes an "all" character string in the target field of the command may be directed towards all downstream devices/players joined in a monitored room). When the player determines that a command directed to the downstream device has been received, the method may proceed to step 643. Otherwise, the method may end.

At step 643, the player identifies the command. The received command may include a command identifier. For example, the player may identify a status command by identifying a command identifier that includes a "status:brief" character string. Additionally, depending on the command identifier, the received command may also include one or more parameters. The player may identify the command based on the command identifier and, if needed, extract the parameters from the received command. For example, the player may identify a manifest command by identifying a command identifier that includes a "manifest" character string. The player, upon identifying the "manifest" character string may parse the command to extract the manifest command parameter (e.g., extract a character string identifying the manifest file name/address).

At step 645, the player and/or the downstream device processes the identified command. The processing of the command depends on the type of command received. As discussed above with respect to FIG. 5, commands can be of various types. For example, some commands may request the downstream device to change states and/or perform a particular action (e.g., a play command, a stop command, a manifest command, a reload command, a fullscreen command, etc.). When such a command is received, the downstream device may perform the requested action (e.g., play the current manifest, stop playing the current manifest, begin decoding data according to a requested manifest, reload the current browser page, toggle fullscreen, etc.).

Some commands may request the player to change the trace settings of the downstream device (e.g., a trace command, a traceoff command, etc.). When such a command is received, the player may change the trace settings in accordance with the identified command and/or the one or more parameters of the command (e.g., activate the specified tracing area(s) and at the specified verbosity level(s), turn off all tracing, etc.).

Additionally, some commands may request a response from the player (e.g., a status command). When such a command is received, the player may proceed to determine and transmit the response. For example, one command that requests the response may be a status command. The status command may be followed by a parameter indicating the verbosity level of the requested status response (e.g., brief, full, etc.). When a status command is received, the player may gather telemetry information according to the status command's parameter, place the gathered telemetry information in a telemetry information message, and transmit the telemetry information message to the monitored room.

The header of the telemetry information may indicate that the message is a response to a command and/or may indicate the command (e.g., a telemetry information message type field may indicate "response", "response/status:brief", "response/status:full", or "status:brief", etc.). In one example, a player receives a status message indicating a verbosity level of "brief" (e.g., "status:brief"). In response, the player gathers telemetry information according to the "brief" verbosity level, such as a revision number of the downstream device, an IP address of the downstream device, a current manifest identifier, a state identifier of the current manifest (e.g., playing, paused, stopped, etc.), a playback rate, and a fullscreen status (e.g., "true" if the current asset/manifest is being viewed in fullscreen; "false" if the current asset/manifest is not being viewed in fullscreen), etc. Once gathered and placed in a message, the response may be transmitted to a monitored room. One example telemetry information message transmitted in response to a "status:brief" message could be:

"response/status:brief/rev=1.1::ip=1.1.168.101::
playerstate=Stopped::videoobw=32 kB::audiobw=29 kB::manifest=622::fullscreen=False"

FIG. 7A illustrates an example method for processing telemetry information at a manager. At step 701, a manager may transmit a request to join a monitored room. The request to join a monitored room may be similar to the request transmitted from a player, as described above. Additionally, in some embodiments, operators of the central office may determine when a manager requests to join a monitored room, and/or what monitored rooms the manager requests to join. At step 703, the manager may receive an acknowledgement of a successful room join. The received acknowledgement may be similar to the acknowledgement received by a player, as described above.

At step 705, the manager may determine whether telemetry information has been received. In some arrangements, the manager monitors the telemetry information messages that are "posted" in a monitored room. For example, a manager may receive a telemetry information message from a player via a monitored room. In some arrangements, the player may transmit a telemetry information message to a monitored room (e.g., an unsolicited telemetry information message, a response telemetry information message, etc.). The monitored room may process the message and transmit it to other member managers and players, such as the managers and players that are joined to the room. When the manager determines that telemetry information has been received, the method may proceed to step 707. Otherwise, the method may continue to monitor the monitored room for telemetry information.

At step 707, the manager may process the received telemetry information. The processing may include parsing the telemetry information message and/or identifying various portions of the message, such as the message's header and various value fields (e.g., a video playback rate field, an audio playback rate field, a manifest field, etc.).

At step 709, the manager may determine whether the received telemetry information is relevant. What is relevant may depend on the type of manager. For example, in some embodiments, a manager can be configured to monitor for one or more particular types of telemetry information (e.g., monitor for particular value field types in the telemetry information message, such as a video playback field, an audio playback field, a manifest field, etc.). To monitor for the one or more particular types of telemetry information, a manager may determine whether the received telemetry information message includes information of the one or more particular type (e.g., determine whether the message includes a video playback field, an audio playback field, etc.), and may, based on determining that the message includes information of the particular types, identify the relevant value fields from the telemetry information message. Various types of managers may be configured to monitor for specific types of telemetry information. In one example, a video service manager may determine whether the received telemetry information message includes telemetry information related to video services (e.g., bit rate information, packet loss information, name of a current manifest of a device, name of current video service being consumed at a device, information related to the status of the device, such as whether video is currently playing, etc.). In another example, an advertising manager may determine whether the telemetry information message includes telemetry information related to advertising, such as advertisement insertion data (e.g., the number of times an advertisement was inserted), advertisement viewing data (e.g., the number of times an advertisement was viewed), advertisement viewing duration data (e.g., the duration for which the advertisement was viewed until a viewer stopped playback of the advertisement, such as by switching channel, etc.), and the like.

At step 711, the manager may extract the relevant information. Upon extraction, the manager may perform further processing and/or analysis of the relevant information. For example, the manager may analyze and/or correlate the relevant information (e.g., in real time) with other information, such as other relevant information and/or other service information (e.g., information from a router, content distribution network information, distribution network topology information, etc.). By performing the analysis and/or correlation between the relevant information and other information, a manager can draw conclusions based on the relevant information. For example, a video service manager may, from the analysis and/or correlation, be able to determine whether a device is experiencing a network problem. The video service manager may also determine a location or root cause of a network problem (e.g., that router 315 of FIG. 3 is a potential cause of a low bit rate, or other network problem) and/or a scope of a network problem (e.g., that a low bit rate is affecting multiple downstream devices, such as device 307-*a*, 307-*b* and 307-*c* of FIG. 3).

In some embodiments, the analysis and/or correlation of the relevant information can include comparing the values of various conditions, status information, etc., included in the relevant information and/or other information to determine whether particular criteria and/or conditions are satisfied. In one instance, a manager may analyze the relevant information to determine whether a network problem exists. One network problem among a number of possible problems that may be determined by a manager, such as a video service manager, can be whether a bitrate is below a threshold value. For example, a video service manager may analyze the relevant information and determine whether a bitrate is below a threshold value. If the bitrate is below a threshold value, the downstream device that sent the telemetry information message may be experiencing a video service problem. Other network problems or conditions/criteria can be determined when analyzing and/or correlating the relevant information. Generally, what network problems, conditions and/or criteria can be determined depends on the contents of the telemetry information (e.g., the value fields included in the relevant information). For example, other managers may perform similar analysis (e.g., an advertising manager may create reports based on the satisfaction of advertising-related thresholds, such as threshold viewing times for an advertisement, threshold interaction times for an advertising application, etc.).

In some arrangements, a manager may use additional information when analyzing and/or correlating relevant information. For example, topology information of the distribution network may be used by a manager when analyzing and/or correlating relevant information. In some instances, the topology information can include information identifying the devices (e.g., routers, MTS, encoders, fragmenters, servers, downstream devices, etc.) of the distribution network, and the locations of the devices in the network. For example, in some arrangements, the manager may analyze the topology information and the value fields of relevant telemetry information messages to determine where a specific device is in the network. In one instance, the manager locates the downstream device in the network using an address of the downstream device and the topology information. In other arrangements, the manager may, using the topology information, monitor devices of a first location (e.g., a particular zip code, devices of a particular MTS, etc.). For example, the manager may filter relevant information based on whether the messages are from a device in a particular location.

In some illustrative embodiments, the manager may be configured to identify a cause of the network problem, such as identifying a source device of the network problem and/or a network event that may be causing the problem based on the relevant telemetry information. For example, a video service manager may be configured to determine a network event that may be causing the network problem. Such network events could include various events caused by the transport and/or processing of service information (and other data) throughout the network. In one instance, the video service manager can identify that the network is experiencing a high volume of network traffic, which may be causing a network problem such as a low bitrate. The identification of other network events are also possible. As another example, a video service manager may be configured to determine a possible source of a network problem. In one example, referring to FIG. 3, the illustrated system includes router 315 that is capable of transmitting signals to the downstream devices. In some instances, router 315 may be malfunctioning or operating unexpectedly and causing the downstream devices to experience a network problem, such as a low bitrate. Based on an analysis of the telemetry information and topology information, the manager may identify router 315 as a potential source of a network problem and gather information related to the router for inclusion in a later message or management report. In some instances, the gathered information may include an identifier of the router, an address of the router (e.g., IP address), a location of the router, etc.

Additionally, the manager may be configured to identify the scope of various criteria and/or conditions. For example, a manager, such as a video service manager, may determine that multiple downstream devices are experiencing a network problem, such as a low bitrate. Based on the devices experiences the network problem, the video service manager could determine if the devices all reside in a particular location, or if the devices are throughout different locations in the distribution network. Further, in some arrangements, multiple devices experiencing a network problem could be used when identifying a source device/network event of the problem. For example, if three devices (e.g., devices 307-*a*, 307-*b* and 307-*c* of FIG. 3) are experiencing a network problem, a manager could analyze the locations of these devices in the distribution network and/or the communication paths between a server of the content provider and the devices to determine areas of overlap. These areas of overlap could include malfunctioning devices. In one instance, a router (e.g., router 315 of FIG. 3) may be malfunctioning and this router may be in the communication path to all devices experiencing the problem. The manager may identify this common router as a possible source of the network problem.

In some embodiments, the further processing of the relevant information can include creating a message summarizing the relevant information and/or any other information determined based on the relevant information. For example, a manager may create a management report, or some other similar message, based on the extracted relevant telemetry information and/or the information determined from the analysis and/or correlation. For example, a video service manager may create a management report that includes relevant telemetry information related to video services, such as video rate playback fields, audio rate playback fields, etc. One example report includes bitrates, packet loss information, and other video-service related information. In another example, a report may include the message fields of the relevant telemetry information messages. In some arrangements a message/management report may include other information, such as the results/conclusions of the analysis and/or correlation of the relevant information (e.g., location(s), cause(s) and/or potential cause(s) of a network problem, a scope of a network problem, etc.). In one example, a message may include information identifying a potential cause of a network problem (e.g., information identifying router 315 of FIG. 3, etc.), information identifying the devices affected by a network problem (e.g., a listing of devices affected by a network problem, such as devices 307-a, 307-b and 307-c of FIG. 3, etc.), and/or information identifying a location and/or scope of the network problem (e.g., a geographical area encompassing the affected devices, etc.).

In some embodiments, the management reports may only be created when analysis and/or correlation results in a determination that particular thresholds are satisfied. In one example, a video service manager may only generate a report when one or more devices are experiencing a network problem, such as a low bitrate, and/or when a potential cause can be identified.

Additionally and/or alternatively, in some embodiments, the message/report may include information extracted from multiple telemetry information messages. For example, the manager may create a report that includes the relevant information and/or other information determined from any analysis and/or correlation received in a monitored room over a particular time period (e.g., a report is periodically created every five minutes, every hour, etc.). As another example, a report may be created based on receiving a particular number of relevant telemetry information messages (e.g., a report is generated every fifth telemetry information message that is relevant). The report may include all or a portion of the relevant information received since the last report was created and/or any information determined based on the analysis/correlation of the relevant information. In some embodiments, a management report may be organized the same as, or similar to, a telemetry information message (e.g., with a header and value fields as illustrated in FIG. 5).

One example message/management report is as follows. In some arrangements, the example management report could be created by a video service manager. The example report includes a header, and value fields indicating the IP address of a downstream device and a bitrate of the downstream device. Particularly, the example report illustrates a message/report that includes information related to a low bitrate network problem. The example report, in some arrangements, may be transmitted to another monitored room, downstream device, other system of the content provider, etc.

"unsolicited/ip=1.1.168.101::videoobw=32 kB::
Message=Device at 1.1.168.101 is experiencing a low bitrate of 32 kB."

In some embodiments, the manager may transmit the created messages/management reports to a destination for further processing. For example, in some embodiments, management reports may be transmitted to a server that causes the reports to be placed into a database and/or onto a website. Operators may be notified whenever a new management report has been transmitted to the database and/or website so that they can view the report and begin responding to the information within the report (e.g., initiate a customer service session with the user of the downstream device, initiate a secondary troubleshooting process, etc.) When placed on a website and/or database, the reports may be viewed by an operator of the content provider. As another example using a website and/or a database, the messages/reports could be viewed (or information based on the messages/reports could be viewed) by an operator of the content provider that is assisting the user via a customer service call (e.g., telephone call) or session (e.g., chat session with the customer via a website). During the call or session the operator could view the message history of the user's device(s) in order to better serve and/or solve the problems being experienced by the user. The operator could also cause commands to be issued to the device of the user (and, in some instances, subsequently receive telemetry information responsive to the commands) in order to better serve and/or solve the problems being experienced by the user. The operator may also be able to change the mode of operation of the downstream device (e.g., from a one way mode of operation and vice versa, etc.).

Messages/reports may also be transmitted to a downstream device in order to display information based on the message/report to a user. For example, a notification, such as a pop-up window displayed on a television screen, could be displayed that notifies the user of the network problem (e.g., "We are sorry, but your area is experiencing a service interruption", etc.). As yet another example, the management reports may be transmitted to another monitored room and/or manager (e.g., see FIGS. 10-12).

Additionally and/or alternatively, the messages/reports could be transmitted to one or more downstream devices. For example, a manager, such as a video service manager, could transmit a message/report to a downstream device that is determined to be experiencing a network problem. The message/report may include information that indicates to the downstream device that they are likely experiencing a network problem. Details on the determined problem could also be included in the message/report. Upon receiving the message/report, the downstream device may display this information for viewing by a user and/or store the message in a message log, or similar data store.

Referring again to FIG. 7A, at step 713, the manager may determine whether to continue monitoring the monitored room for telemetry information. If the manager is to continue monitoring the monitored room, the method may proceed to step 705. Otherwise, the method may end. For example, in some embodiments, an operator of the content provider may cause the manager to stop monitoring the monitored room. In some embodiments, stopping monitoring the monitored room may include transmitting a message requesting to leave the monitored room.

Figure 7B:
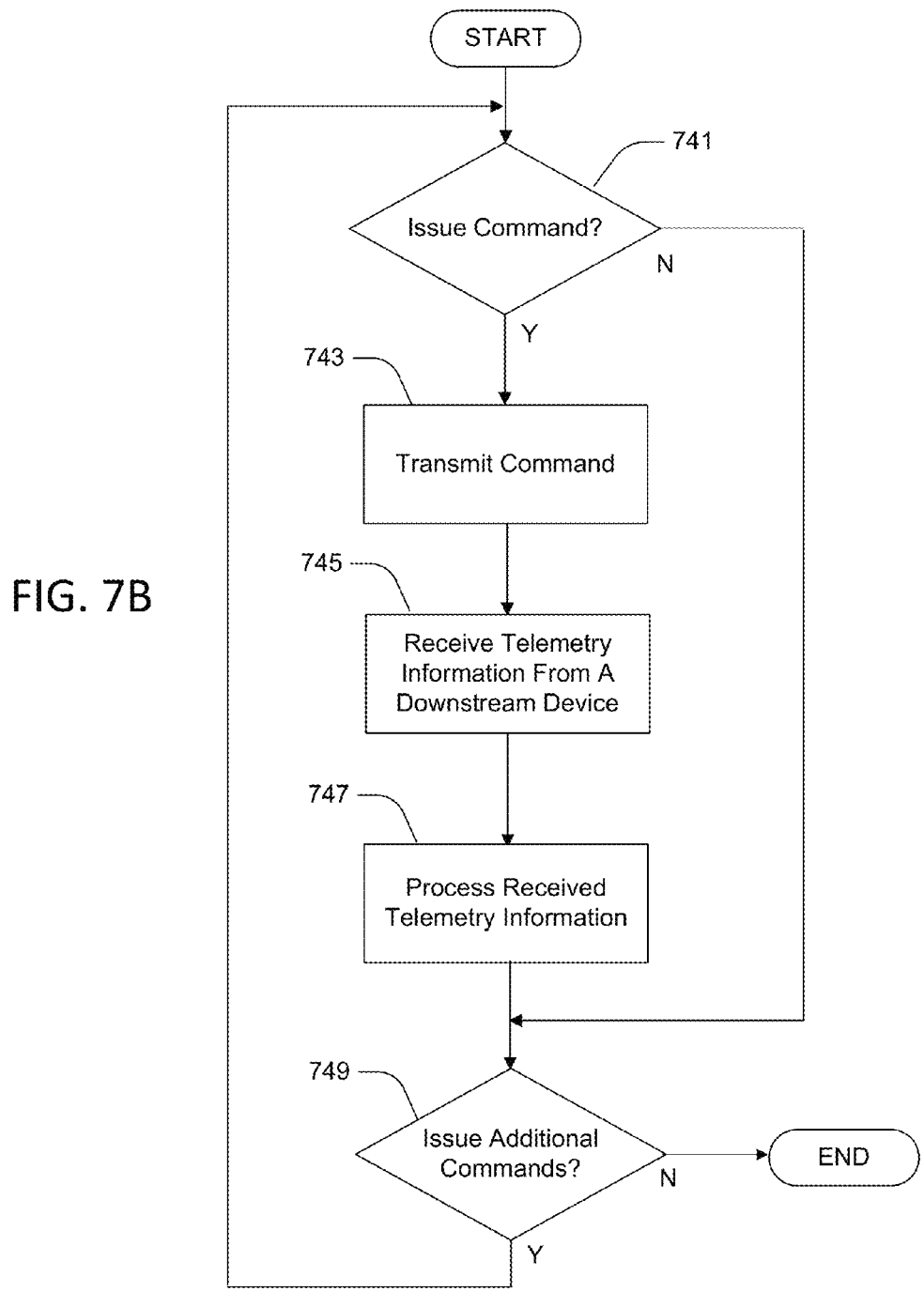
FIG. 7B illustrates an example method for issuing one or more telemetry information commands from a manager to a downstream device according to one or more aspects described herein.

FIG. 7B illustrates an example method for issuing one or more telemetry information commands from a manager to a downstream device (e.g., a downstream device operating in a two-way mode). This example method can be used to issue commands to a downstream device, cause the downstream device to process the command, and receive telemetry information responsive to the commands.

At step 741, the manager may determine whether to issue a command. If it is determined to issue a command, the method may proceed to step 743. Otherwise, the method may proceed to step 749. In some embodiments, the determination of whether to issue a command may be based on a script being processed by the manager.

At step 743, the manager may issue a command. For example, any of the various commands may be prepared and transmitted to a downstream device (e.g., via the monitored room): a play command, a play fullscreen command, a stop command, a manifest load command, a fullscreen command, a reload command, a status command, a trace command, a de-activate trace command, etc. In some embodiments utilizing a script, the script may cause a downstream device, via one or more commands issued from the manager to a player of the downstream device, to cycle through one or more different device states (e.g., decode a video-on-demand service, play a video asset, transmit telemetry information related to the video-on-demand service and/or the playing of the video asset).

In some arrangements, the downstream devices may be assigned to device groups. In one example, the manager assigns devices associated with the players of a monitored room (e.g., devices associated with the 100 players joined to the monitored room, etc.) into one or more device groups (e.g., divide the devices among 10 device groups, etc.). The manager may be configured to transmit a command to a particular device group using device group identifiers in the command. Transmitting a command to a particular device group allows for all members of the device group to receive, process, and perform the command. In some embodiments, the manager may dynamically assign devices to the device groups. For example, the manager may assign all devices that satisfy particular conditions and/or criteria to the same device group. In one particular example, all devices experiencing a network problem, such as a low bitrate, can be assigned by the manager to the same device group. The manager can then issue a command to all devices experiencing the network problem.

At optional step 745, the manager may receive telemetry information (e.g., a telemetry information message via the monitored room) from the downstream device. In one example, the manager may monitor for a telemetry information message that is in response to an issued command. To determine whether a received message is in response to the issued command, the manager may examine the telemetry information message type field of the message based on the issued command (e.g., for a type field having a value of "response/status:brief" when a brief status command was transmitted, for a type field having a value of "response/status:full" when a full status command was transmitted, etc.). Other values could also be included in order to determine whether a received message is in response to an issued command (e.g., "solicited" as opposed to "unsolicited", etc., where messages including a "solicited" character string are sent when they are in response to a command).

At optional step 747, the manager may process the received telemetry information. For example, a manager may process the telemetry information to verify that the downstream device is operating as expected (e.g., a video service manager may verify video-service information included in the response message, such as verifying that bitrates, etc. are within expected thresholds, etc.). In one example utilizing a script, the script may include verified information, which can be compared against information received in the telemetry information messages. By comparing the information against the verified information, the script can determine whether the downstream device is operating as expected (or incorrectly). In some arrangements, processing the received telemetry information may include creating one or more management reports and, optionally if reports are created, transmitting the reports for further processing.

At optional step 749, the manager may determine whether to issue one or more additional commands. In one example utilizing a script, if the script is continuing to be processed by the manager, the method may proceed to step 741. Otherwise, the method may end. In another example, the manager may be configured to issue a second command after issuing a first command (e.g., issue a status command after issuing a manifest load command, issue a status command after issuing a play command, etc.).

As discussed above, devices may be assigned to device groups and commands can be issued to members of a device group. In some illustrated embodiments, device groups could be used when a manager is validating the operation of some devices of the distribution network. For example, test devices could be established throughout the network, and the test devices may be assigned to different device groups (e.g., into location-based device groups, such as an east-coast device group, a Midwest device group, a northwest device group, etc.) A manager may be configured to issue particular commands to these test devices in a particular order. In one example, a manager may cause test devices of a device group to receive and decode particular content (e.g., load a certain manifest), and then have the test devices send certain telemetry information messages. The manager can analyze the received messages to validate that the content is being received correctly for the test devices of that device group, even if a user is not presently consuming (e.g., watching) the content. In some arrangements, the content being validated may not be available to users for consumption (e.g., viewing). For example, a new content asset could be distributed onto the distribution network on a Wednesday, but the new asset would not be available to users of the network until Friday. Test devices could be set up throughout the network to validate that devices can receive and decode the new asset prior to it becoming available on Friday. Setting up these test devices may require changing the mode of the devices (e.g., from a one way mode to a two-way mode, etc.).

Figure 8:
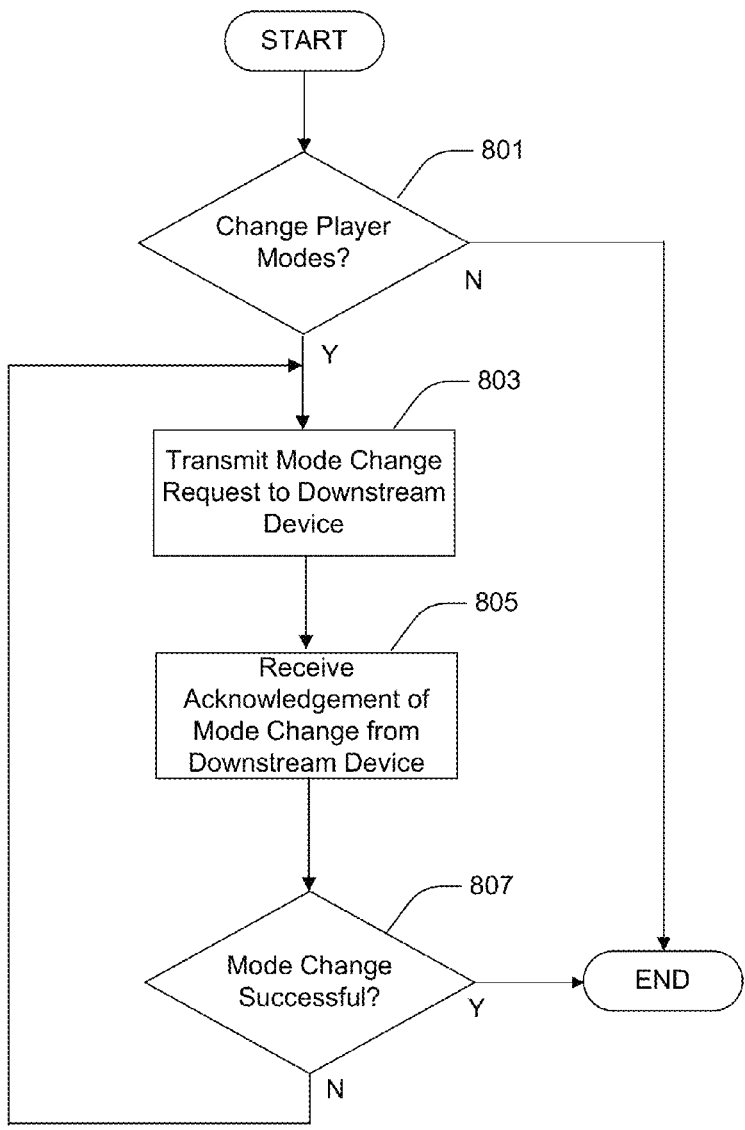
FIG. 8 illustrates an example method for causing a downstream to switch between the one-way and two-way modes of operation according to one or more aspects described herein.

In some embodiments, a manager may be configured to cause a downstream device to change modes (e.g., from a one-way mode to a two-way mode, from a two-way mode to a one-way mode, etc.). FIG. 8 illustrates an example method for causing a downstream to switch between the one-way and two-way modes of operation. At step 801, a manager may determine whether to change a mode of operation of a downstream device. If it is determined to proceed with changing a mode of operation of a downstream device, the method may proceed to step 803. Otherwise, the method may end. In some embodiments, an operator may cause the manager to proceed with transmitting a mode change request. In one example, an operator may modify stored settings that identify the modes of operation that the downstream devices should currently operate in. Based on the changes to the stored settings, the manager may determine to transmit mode change requests to the devices (e.g., a first mode change request identifying a two-way mode of operation is to be transmitted to a first downstream device, a second mode change request identifying a one-way mode of operation is to be transmitted to a second downstream device, etc.). Additionally, in some arrangements utilizing a script, an action of a script may cause the manager to proceed with transmitting a mode change request.

At step 803, the manager may transmit a mode change request to a downstream device. In some arrangements, the mode change request may be similar to a command (e.g., embodied as an XMPP message, transmitted to a downstream device via a monitored room, etc.). In others, the mode change request may be separate from other commands issued by the manager (e.g., commands may be transmitted to a downstream device via a monitored room, while mode change requests are sent directly to the downstream device, etc.). Additionally, in some arrangements, the mode change request may identify a particular mode of operation to change to (e.g., a mode change request identifies a one-way mode of operation, a second mode change request identifies a two-way mode of operation). A downstream device, upon receiving a mode change request, may cause the player to change to a mode of operation in accordance with the request (e.g., switch to the mode of operation identified by the request, switch from a one-way mode of operation to the two-way mode of operation, switch from a two-way mode of operation to a one-way mode of operation, etc.). Upon completing the mode change, the downstream device may, in some embodiments, transmit an acknowledgement of the mode change.

At step 805, the manager may receive an acknowledgement of a mode change from a downstream device. The acknowledgement may identify whether the mode change was successful or not. At step 807, the manager determines whether the mode change was successful (e.g., by examining the acknowledgement). If the mode change was successful, the method may end. Otherwise, the method may proceed to step 803 to re-transmit a mode change request.

Figure 9:
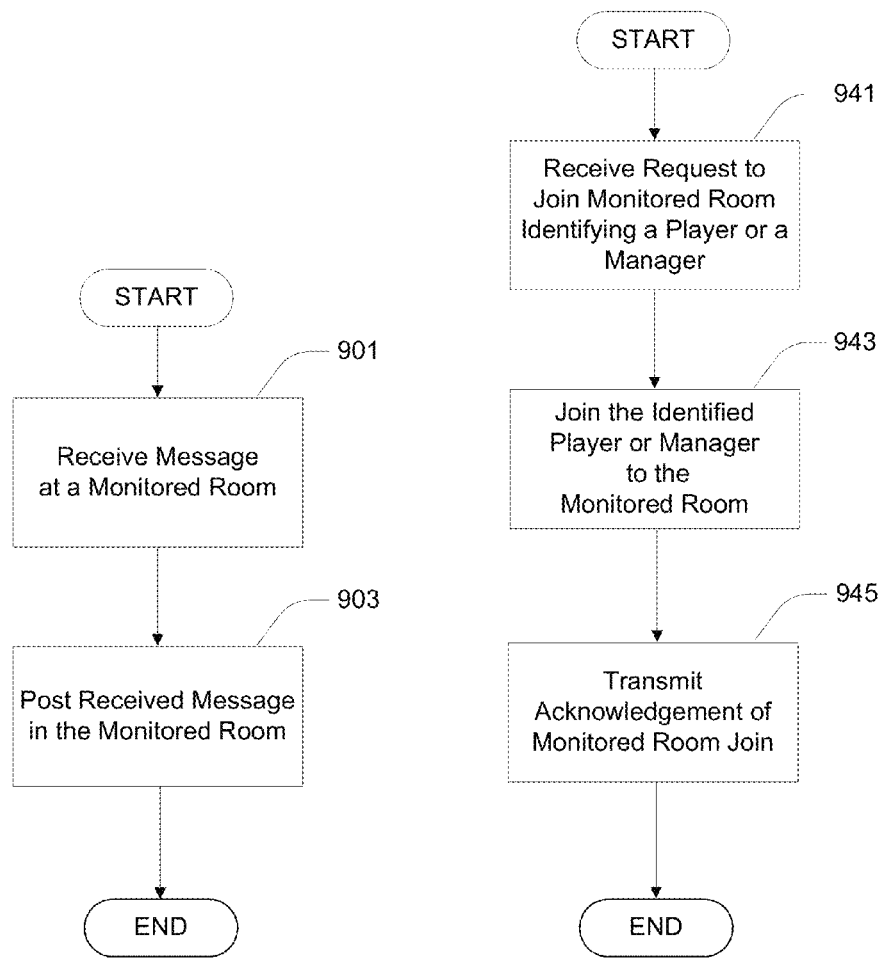
FIG. 9A illustrates an example method for receiving telemetry information at a monitored room according to one or more aspects described herein.
FIG. 9B illustrates an example method for joining a player or manager into a monitored room according to one or more aspects described herein.

As discussed above, a monitored room may receive telemetry information messages and commands. FIG. 9A illustrates an example method for receiving telemetry information at a monitored room according to one or more aspects described herein. At step 901, a monitored room may receive a message (e.g., from a player, manager, or other source). In some embodiments, the received message may be a command, a telemetry information message, or a mode change request.

At step 903, the received message may be "posted" in the monitored room (e.g., posted into the chat room). In some embodiments, the monitored room may forward messages to members of the monitored room (e.g., players and managers that have joined the monitored room). For example, a monitored room may receive a telemetry information message and transmit the message to some or all of the monitored room's member managers and players. As another example, the monitored room may receive a command directed towards a particular downstream device. Upon receipt of a command, the monitored room may analyze header information of the command to identify the command's destination. Then, based on the identified destination, the monitored room may transmit the command to the destination device(s). Commands may be directed to particular downstream devices and/or multiple devices via the header information. In some embodiments using an XMPP-like messaging protocol, the destination may be identified by the XMPP unique identifier. In some arrangements, forwarding messages to members of the monitored room may allow for the members of a monitored to simulate a "chat" room.

As discussed above, managers and players may join one or more monitored rooms. FIG. 9B illustrates an example method for joining a player or manager into a monitored room. At step 941, a request to join a monitored room may be received by a monitored room. The request may identify a particular player, manager, downstream device, server, etc., that is requesting to join the monitored room. At step 943, the monitored room may join the identified player to the monitored room. For example, the monitored room may modify stored data listing current members of the monitored room. At step 945, the monitored room may transmit an acknowledgement of the monitored room join. For example, the monitored room may transmit an acknowledgement to the requesting player or manager that includes information identifying the player or manager was successfully joined to the room. Additionally, in some arrangements, the monitored room may transmit messages that inform the members of the monitored room of the other members (e.g., transmit a message identifying a new member whenever a new player or manager joins the monitored room, transmit a message including an identification of all members of the monitored room to a member of the monitored room, etc.).

Figure 10:
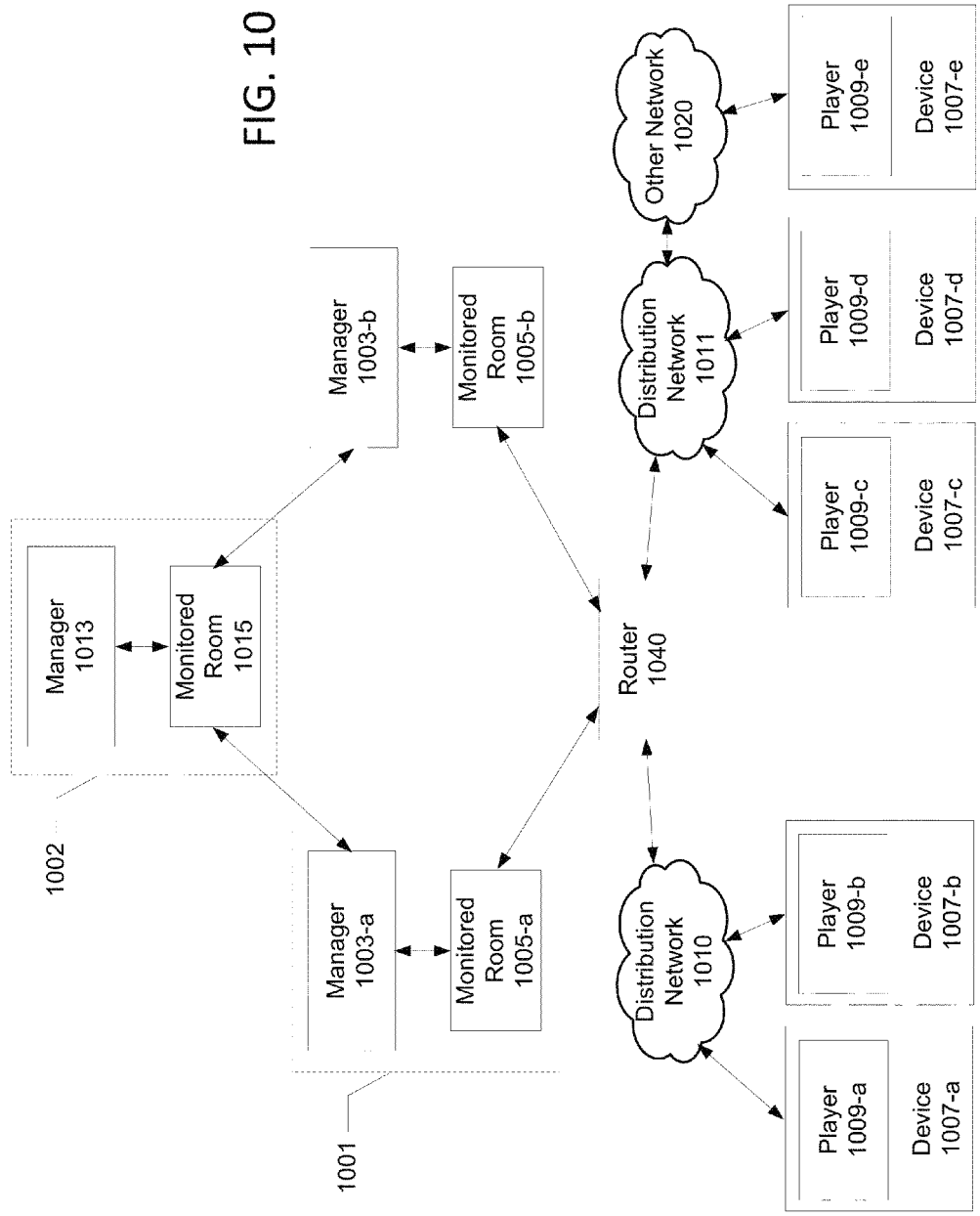
FIG. 10 illustrates an example hierarchical system for monitoring telemetry information and using the telemetry information according to one or more aspects described herein.

Managers, players and/or monitored rooms may be organized in various ways. For example, FIG. 3, which was discussed above, illustrates an example system where players are organized to join a particular monitored room. As another example, FIG. 10 illustrates an example hierarchical system for monitoring telemetry information and using the telemetry information to identify problems of a distribution network. As illustrated in FIG. 10, players 1009-a and 1009-b, of devices 1007-a and 1007-b, respectively, may be configured to join monitored room 1005-a of management server 1001. Device 1007-a and 1007-b may be connected to management server 1001 via distribution network 1010. Players 1009-c, 1009-d, and 1009-e, of devices 1007-c, 1007-d, and 1007-e, respectively, may be configured to join monitored room 1005-b of management server 1001. Device 1007-c and 1007-d may be connected to management server 1001 via distribution network 1011, while device 1007-e may be connect to management server 1001 via distribution network 1011 and other network 1020.

In one or more arrangements, the different players may be configured to join the monitored room based on the location of the devices. For example, device 1007-a and 1007-b may be at or near a first location (e.g., a first zip-code, such as 20001) and be configured to join monitored room 1005-a, while device 1007-c, 1007-d, and 1007-e, may be at or near a second location (e.g., a second zip code, such as 22043) and be configured to join monitored room 1005-b. Accordingly, manager 1003-a may monitor for conditions and/or criteria (e.g., a network problem) for devices at or near the first location, and manager 1003-b may monitor for conditions and/or criteria (e.g., a network problem) for devices at or near the second location. Supervisor manager 1013 can monitor for conditions and/or criteria (e.g., a network problem) occurring at one or both of the locations. Additionally, the managers and rooms may be organized into different levels, with each level for a different geographic size (e.g., local, regional, national, etc.). For example, monitored room 1005-a and 1005-b may be for monitoring devices at a local level (e.g., devices of a single neighborhood or metro area, etc.), while monitored room 1015 may be for monitoring devices at a national level (e.g., all devices in the network of the content provider).

In some arrangements, the different players may be configured to join the monitored room based on the type of telemetry information that will be transmitted while joined to the monitored room. For example, devices 1007-a and 1007-b may desire to transmit video service-related telemetry information, so they request to join monitored room 1005-a. Devices 1007-c, 1007-d, and 1007-e, may desire to transmit advertising-related telemetry information, so they request to join monitored room 1005-b. Particular devices of the distribution network may be capable of transmitting signals to the downstream devices of the different monitored rooms and/or downstream devices of different locations, such as router 1040.

As illustrated in FIG. 10, monitored room 1005-a is monitored by manager 1003-a. Monitored room 1005-b is monitored by manager 1003-b. In some arrangements, manager 1003-a and manager 1003-b may be the same type of manager (e.g., both may be video service managers). In other arrangements, manager 1003-a and manager 1003-b may be different types of managers (e.g., manager 1003-a may be a video service manager and manager 1003-b may be an advertising manager). The managers may process telemetry information and/or issue command in a manner that is the same or similar to the example methods illustrated in FIGS. 7A and 7B.

Figure 11:
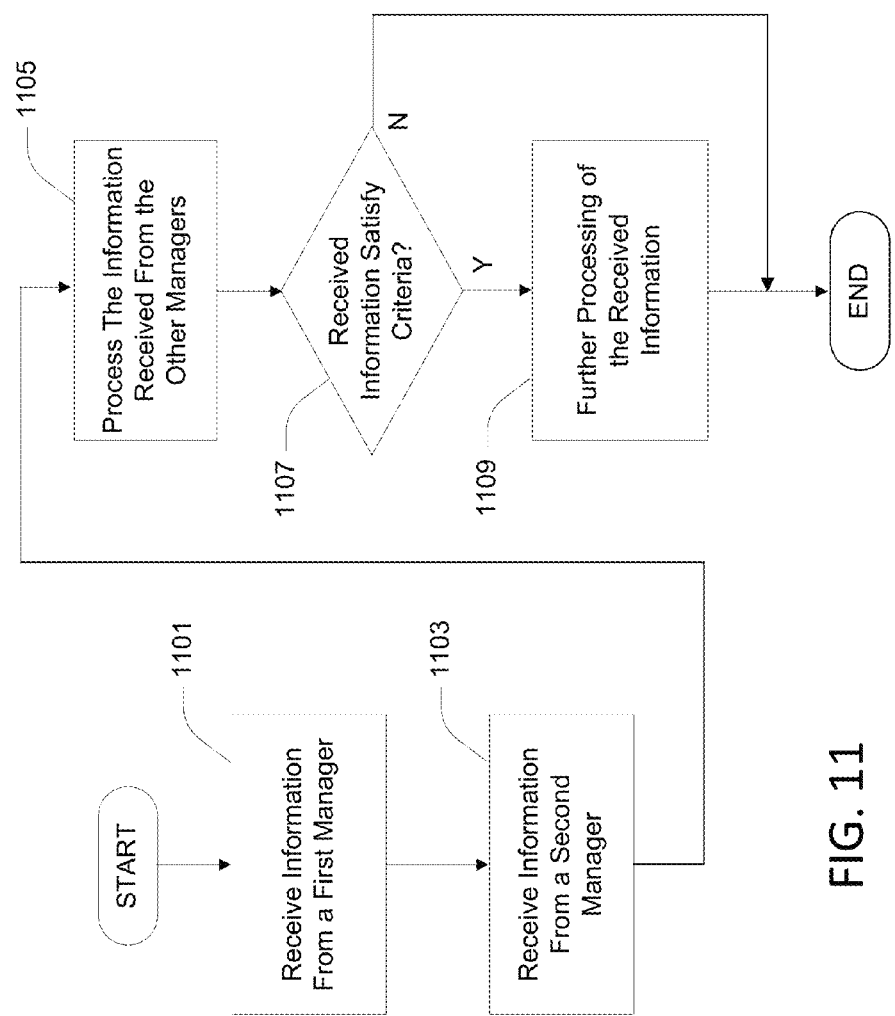
FIG. 11 illustrates an example method for hierarchically processing telemetry information according to one or more aspects described herein.

Managers 1003-a and 1003-b may transmit telemetry information, messages and/or management reports (e.g., via an XMPP-like message) to another monitored room. As illustrated in FIG. 10, manager 1003-a and 1003-b may transmit messages/management reports to monitored room 1015 of management server 1002. Monitored room 1015 may be monitored by manager 1013. For example, manager 1013 may monitor the telemetry information/management reports that are transmitted from managers and players 1003-a and 1003-b, and process the received messages in a manner that is the same or similar to the method illustrated in FIG. 7A. In one example, FIG. 11 illustrates an example method for hierarchically processing telemetry information. The example method of FIG. 11 may be performed by manager 1013 of FIG. 10. Referring to the method illustrated in FIG. 11, at step 1101, a supervisor manager (e.g., manager 1013 of FIG. 10) may receive, via a monitored room (e.g., monitored room 1015 of FIG. 10), telemetry information, messages and/or managements reports from a first manager (e.g., manager 1003-a of FIG. 10). At step 1103, the supervisor manager may receive, via the monitored room, telemetry information, messages and/or management reports (e.g., a second management report) from a second manager (e.g., manager 1003-b of FIG. 10).

At step 1105, the supervisor manager may process the telemetry information, messages and/or reports received from the managers. The processing may include parsing information and/or identifying various portions the information, such as one or more value fields included in each report (e.g., a video playback rate field, an audio playback rate field, a manifest field, etc.).

At step 1107, the supervisor manager may determine whether the received information satisfies certain conditions and/or criteria. If the supervisor manager determines that the received information satisfies certain conditions and/or criteria, the method may proceed to step 1109. Otherwise the method may end. For example, the supervisor manager could compare the information received from each manager to determine whether the information identifies the same or similar network problems. In one example, the information received from the first manager may identify a low bitrate of a first downstream device via a video playback rate field and the information received from the second manager may identify a low bitrate of a second downstream device via a video playback rate field. Because both managers have identified a low bitrate network problem, the supervisor manager may proceed to step 1109 (e.g., the condition of a similar or identical network problem has been satisfied). As another example, the first manager report may determine that the received information include similar relevant information based on the value of the low bitrate (e.g., a bitrates of 6 and 6 are the same, bitrates of 9 and 6 may be similar, while bitrates of 20 and 6 may not be similar). If the value of the low bitrates are the same or similar to each other, the supervisor manager may proceed to step 1109. Supervisor managers may be configured to check the received information for various other conditions and/or criteria (e.g., information is related to a particular location in the network; information is related to a particular advertisement, information is related to a particular content asset, etc.).

At step 1109, the supervisor manager may perform further processing on the received information. For example, the supervisor manager may perform analysis and/or correlation on the received information. Such analysis and/or correlation could proceed in a manner that is the same or similar to the analysis and correlation described above with respect to step 711 of FIG. 7A (e.g., determine a scope of a network problem, a location of a network problem, a possible cause of the network problem, the devices affected by the network problem, etc). As another example, the supervisor manager could create a message/management report based on the received information and/or any results of the analysis and/or correlation. The created message/report could be created to include similar types of information as those described with respect to step 711 of FIG. 7A. For example, if the supervisor manager has determined that a similar network problem has been identified by the managers, the message could include data identifying any downstream devices that are experiencing the problem, data identifying a scope of the problem that was determined by the supervisor manager, a location of the problem that was determined by the supervisor manager, a possible cause of the problem that was determined by the supervisor manager, etc. Additionally, in some embodiments, the created message/report may be used similarly to other messages/management reports (e.g., transmitted for further processing, etc., as described above with respect to FIG. 7A).

In some arrangements, a hierarchical system can be used to identify conditions and/or criteria of the distribution network that affect a larger area, or a larger number of devices. For example, referring to FIG. 10, the illustrated system includes router 1040 that is capable of transmitting signals to downstream devices that are joined to two different monitored rooms (and/or downstream devices of different locations). Router 1040 may be malfunctioning and causing the downstream devices to experience a low bitrate. Manager 1003-a and manager 1003-b may both identify that various downstream devices are experiencing the low bitrate (e.g., manager 1003-a identifies device 1007-a and 1007-b, while manager 1003-b identifies device 1007-c and 1007-d), but they may not identify router 1040 as a potential source of the problem. In one instance, manager 1003-a identifies a device in distribution network 1010 as a possible cause, while manager 1003-b identifies a device in distribution network 1011 as a possible cause. Both manager 1003-a and 1005-b may send a message that includes information related to the network problem to supervisor manager 1013. Supervisor manager 1013 may, using the information from both managers, determine a new possible cause of the network problem, which may be router 1040.

Figure 12:
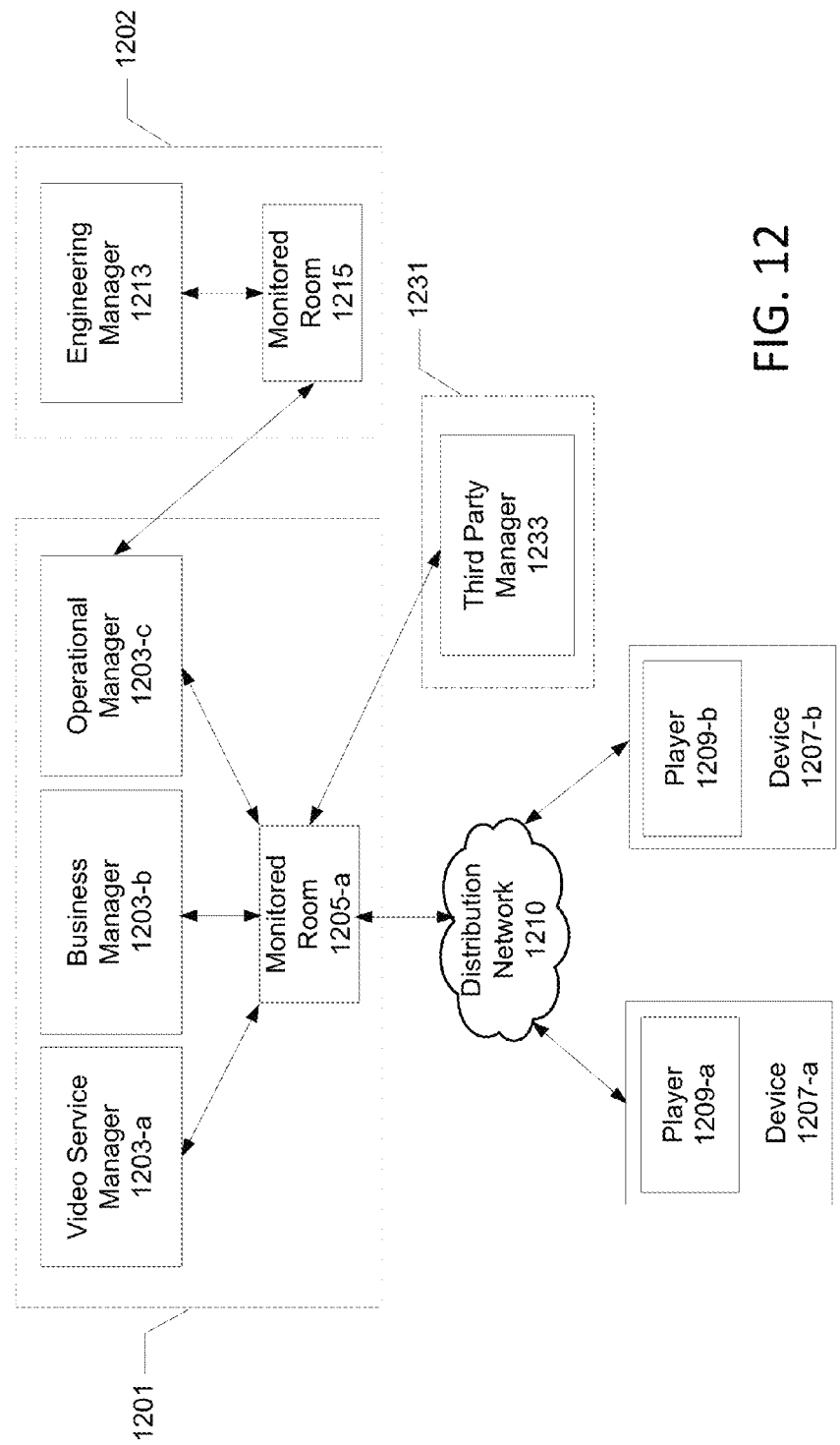
FIG. 12 illustrates an example system for monitoring telemetry information and using the telemetry information via a plurality of managers according to one or more aspects described herein.

As discussed above, a monitored room may be monitored by any number of managers. FIG. 12 illustrates an example system for monitoring telemetry information and using the telemetry information via some different managers. As illustrated in FIG. 12, players 1209-a and 1209-b, of devices 1207-a and 1207-b, respectively, may be configured to join monitored room 1205-a of management server 1201. Device 1207-a and 1207-b may be connected to management server 1201 via distribution network 1210. Monitored room 1205-a may be monitored by video service manager 1203-a, business manager 1203-b, operational manager 1203-c, and third party manager 1233 of third party management server 1231.

Video service manager 1203-a may monitor the telemetry information posted in monitored room 1205-a for information related to video services (e.g., bit rates, etc.). Business manager 1203-b may monitor the telemetry information posted in monitored room 1205-a for information related to managing the content provider's business (e.g., advertisement information such as ad insertion information, viewing habit information, such as the current service(s) being decoded, etc.). Operational manager 1203-c may monitor the telemetry information posted in monitored room 1205-a for information related to operating the content distribution network (e.g., bit rates, current manifest file names, current service(s) being decoded, viewing habit information, etc.). For example, an operational manager may track when devices begin decoding a service in order to track the number of concurrent consumers (e.g., viewers) of a service (e.g., current viewer count). The operational manager could also track how long a device decodes a service (e.g., service dwell time). In some arrangements, the information gathered by the operational and/or business managers could be available for further analysis. In one example, a content provider could use the gathered information to refine service and/or network architecture to make service delivery more cost effective and/or efficient.

The content provider may provide third party management server 1231 access to management server 1201. Third party manager 1233 may monitor the telemetry information posted in monitored room 1205-a for information related to the third party. For example, third party manager 1233 may be an advertising manager of a particular advertiser, and may monitor the telemetry information for information related to the particular advertiser (e.g., information identifying that advertisement A of the particular advertiser has been inserted and/or viewed). As another example, third party manager 1233 may be a channel/service ratings manager that monitors the telemetry information to determine one or more metrics related to viewing habits of the downstream device, such as a count identifying the number of devices currently decoding a particular service (e.g., video-on-demand service, NBC television programming, etc.), a count identifying the number of devices currently decoding data for a particular program, etc.

As also illustrated in FIG. 12, one or more of the managers may transmit messages and/or management reports to another monitored room, such as monitored room 1215 of management server 1202. Monitored room 1215 may be monitored by other managers, such as engineering manager 1213. Engineering manager 1213 may monitor the information received via monitored room 1215 in a manner that is the same as, or similar to, the example method illustrated in FIG. 11. For example, engineering manager 1213 may monitor the telemetry information to determine whether a network problem identified by a plurality of management reports affects multiple locations of the distribution network.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
   transmitting, by a computing device, a request for a manager to join a monitored room, wherein the manager is executing on the computing device and the monitored room is configured to transmit information among members of the monitored room using messaging that conforms to a messaging protocol;
   receiving, via the monitored room, first telemetry information related to a first device of a network in a first message conforming to the messaging protocol;
   receiving, via the monitored room, second telemetry information related to a second device of the network in a second message conforming to the messaging protocol;
   analyzing, by the manager, the first telemetry information and the second telemetry information to determine that both the first device and the second device are experiencing a network problem; and
   determining, based on the determination that both the first device and the second device are experiencing the network problem, a source device of the network that is causing the network problem, the source device being different from the first device and the second device.

2. The method of claim 1, further comprising:
   joining the first device and the second device to the monitored room.

3. The method of claim 1, further comprising:
   transmitting, to the first device from the manager via the monitored room, a command that causes the first device to decode a particular linear service and begin playback of the particular linear service.

4. The method of claim 1, wherein the network problem comprises a low bitrate, and wherein analyzing the first telemetry information and the second telemetry information to determine that both the first device and the second device are experiencing the network problem comprises:
   extracting a first bitrate indicator from the first telemetry information, the first bitrate indicator indicating a bitrate at which the first device is causing playback of video;
   extracting a second bitrate indicator from the first telemetry information, the second bitrate indicator indicating a bitrate at which the second device is causing playback of video;
   determining that both the first bitrate and the second bitrate are below a threshold value; and
   responsive to determining that both the first bitrate and the second bitrate are below the threshold value, determining that both the first device and the second device are experiencing the low bitrate.

5. The method of claim 1, wherein the network problem comprises one or more of the following: a variation in fragment quality level, or a device buffer event.

6. The method of claim 1, wherein the monitored room comprises a chat room, and the messaging protocol is one of the following: an instant messaging protocol, a chat messaging protocol, a real-time text-based messaging protocol, or Extensible Messaging and Presence Protocol (XMPP).

7. The method of claim 1, wherein determining the source device of the network that is causing the network problem comprises comparing communication paths between a server and both the first device and the second device to determine an overlap of the communication paths, wherein the source device being located within the overlap of the communication paths, and wherein the method further comprises:
   creating, by the manager, a message that includes information related to the network problem; and
   transmitting, by the manager, the message to another monitored room.

8. The method of claim 1, further comprising:
   transmitting, to the first device via the monitored room, a command to provide advertising information;
   receiving, from the first device via the monitored room, one or more messages that conform to the messaging protocol and are responsive to the command; and
   analyzing the one or more messages to determine one or more of the following: advertisement insertion data, advertisement viewing data, or advertisement viewing duration data.

9. The method of claim 1, further comprising:
transmitting, to the first device via the monitored room, a command to provide viewing information;
receiving, from the first device via the monitored room, one or more messages that conform to the messaging protocol and are responsive to the command; and
analyzing the one or more messages to determine one or more of current viewing count data or service dwell time data.

10. The method of claim 1, further comprising:
transmitting, to the first device via the monitored room, a mode change request that causes the first device to switch between a one-way mode of operation and a two-way mode of operation, wherein the one-way mode of operation disables processing of commands received by the first device from the manager via the monitored room and the two-way mode of operation enables processing of commands received by the first device from the manager via the monitored room.

11. The method of claim 1, further comprising:
transmitting, to the first device from the manager via the monitored room, a command that causes the first device to decode a particular video-on-demand service and begin playback of the particular video-on-demand service.

12. The method of claim 1, further comprising:
transmitting, to the first device from the manager via the monitored room, a command that causes the first device to stop playback.

13. The method of claim 1, further comprising:
transmitting, to the first device from the manager via the monitored room, a command that causes the first device to perform a fast-forward.

14. The method of claim 1, further comprising:
transmitting, to the first device from the manager via the monitored room, a command that causes the first device to perform a rewind.

15. The method of claim 1, further comprising:
transmitting, to the first device from the manager via the monitored room, a command that causes the first device to return to live content.

16. A method, comprising:
monitoring, by a first manager executing on a computing device, a first monitored room that is configured to transmit, using messaging that conforms to a messaging protocol, information among the first manager, a second manager and a third manager, wherein the second manager is monitoring a second monitored room for telemetry information from first devices of a network, and wherein the third manager is monitoring a third monitored room for telemetry information from second devices of the network;
analyzing, by the second manager, a set of telemetry information received from the first devices via the second monitored room to determine that at least one of the first devices is experiencing a network problem;
analyzing, by the third manager, a set of telemetry information received from the second devices via the third monitored room to determine that at least one of the second devices is experiencing the network problem;
receiving, by the first manager from the second manager via the first monitored room, a first message that conforms to the messaging protocol and comprises an indication that the at least one of the first devices is experiencing the network problem;
receiving, by the first manager from the third manager via the first monitored room, a second message that conforms to the messaging protocol and comprises an indication that the at least one of the second devices is experiencing the network problem; and
determining, based on the first message and the second message, a location in the network that is causing the network problem.

17. The method of claim 16, wherein the network problem comprises a low bitrate.

18. The method of claim 16, wherein the network problem comprises a variation in fragment quality level.

19. The method of claim 16, wherein the first message comprises an indication of a second manager-determined location that is causing the network problem, wherein the second message comprises an indication of a third manager-determined location that is causing the network problem, and wherein the location in the network is different from both the second manager-determined location and the third manager-determined location.

20. The method of claim 16, wherein the messaging protocol is one of the following: an instant messaging protocol, a chat messaging protocol, a real-time text-based messaging protocol, or Extensible Messaging and Presence Protocol (XMPP).

* * * * *

UNITED STATES PATENT AND TRADEMARK OFFICE
CERTIFICATE OF CORRECTION

PATENT NO.         : 9,055,030 B2
APPLICATION NO.    : 13/181869
DATED              : June 9, 2015
INVENTOR(S)        : Brian Field et al.

Page 1 of 1

It is certified that error appears in the above-identified patent and that said Letters Patent is hereby corrected as shown below:

Specification

Column 10, Detailed Description of Embodiments, Lines 40-41:
    Delete ""client-player307-a")" and insert --"client-player 307-a")--

Column 18, Detailed Description of Embodiments, Line 26:
    Delete "301" and insert --305--

Signed and Sealed this
Fifth Day of April, 2016

Michelle K. Lee
*Director of the United States Patent and Trademark Office*